US011516290B2

(12) United States Patent
Jacob et al.

(10) Patent No.: US 11,516,290 B2
(45) Date of Patent: Nov. 29, 2022

(54) SHARING TUPLES ACROSS INDEPENDENT COORDINATION NAMESPACE SYSTEMS

(71) Applicant: International Business Machines Corporation, Armonk, NY (US)

(72) Inventors: Philip Jacob, Congers, NY (US); Philip Neil Strenski, Yorktown Heights, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/719,440

(22) Filed: Dec. 18, 2019

(65) Prior Publication Data
US 2021/0194958 A1    Jun. 24, 2021

(51) Int. Cl.
*H04L 67/1097* (2022.01)
*H04L 12/18* (2006.01)

(52) U.S. Cl.
CPC .......... *H04L 67/1097* (2013.01); *H04L 12/18* (2013.01)

(58) Field of Classification Search
CPC .............................. H04L 67/1097; H04L 12/18
See application file for complete search history.

(56) References Cited

U.S. PATENT DOCUMENTS

| 8,204,856 B2 | 6/2012 | Meyer et al. |
| 8,255,430 B2 | 8/2012 | Dutton et al. |
| 10,084,634 B2 | 9/2018 | Leppanen et al. |
| 10,244,053 B2 | 3/2019 | Bestler et al. |
| 10,275,179 B2 | 4/2019 | Petrocelli |
| 2007/0014278 A1* | 1/2007 | Ebbesen ............... H04L 67/327 370/351 |
| 2014/0230018 A1* | 8/2014 | Anantharaman ... H04L 12/2816 726/4 |

(Continued)

OTHER PUBLICATIONS

Anonymous, "Method and System to detect when a face-to-face meeting is occurring, recording actions and share among participants", IP.com, IPCOM000254720D, Jul. 25, 2018, 4 pages.

(Continued)

*Primary Examiner* — Nicholas R Taylor
*Assistant Examiner* — Sm Z Islam
(74) *Attorney, Agent, or Firm* — Scully, Scott, Murphy & Presser, PC; Daniel P. Morris, Esq.

(57) ABSTRACT

A system and method for federating a tuple storage database across multiple coordinated namespace (CNS) extended memory storage systems allowing the sharing of tuples and tuple data across independent systems. The method provides a federation service for multiple coordination namespace systems. The method retrieves a tuple from connected independent CNS systems wherein a local CNS Controller sends a read request to the local gatekeeper to retrieve a first tuple and creates a local pending remote record. The local gatekeeper at a requesting node sends a broadcast query to a plurality of remote gatekeepers for the tuple and Remote gatekeepers at remote nodes query in its local CNS for the tuple. The Local gatekeeper process at the requesting node receives results from a plurality of remote gatekeepers for the said tuple and selects one remote gatekeeper to receive the requested tuple and broadcasts a read for tuple data with selected gatekeeper.

20 Claims, 11 Drawing Sheets

(56) References Cited

U.S. PATENT DOCUMENTS

| | | |
|---|---|---|
| 2016/0065490 A1 | 3/2016 | Leff et al. |
| 2017/0170955 A1 | 6/2017 | Wood et al. |
| 2018/0203641 A1* | 7/2018 | Petrocelli .............. G06F 3/0647 |
| 2019/0108229 A1* | 4/2019 | Sista ................... H04L 67/2895 |
| 2021/0058231 A1* | 2/2021 | Nogayam .......... G06Q 20/3827 |
| 2021/0097202 A1* | 4/2021 | Datta ................. G06F 21/6227 |

OTHER PUBLICATIONS

Mariani et al., "Novel Opportunities for Tuple-based Coordination: XPath, the Blockchain, and Stream Processing", 18th Workshop From Objects to Agents (WOA2017), Scilla, RC, Italy, Jun. 16, 2017, 4 pages.

Belyaev et al., "Component-oriented access control—Application servers meet tuple spaces for the masses", Future Seneration Computer Systems, 2017, Accepted May 5, 2017, pp. 1-14.

Anonymous, "A Method to Support Multiple Keys in Table Lookup Engines", IP.com, IPCOM000246002D, Apr. 25, 2016, 8 pages.

Anonymous, "Method for smart namespace schema discovery for third party data source providers of linked data", IP.com, IPCOM000231061D, Sep. 25, 2013, 4 pages.

IBM, "A method for efficient creation of notifications in SIP", IP.com, IPCOM000188098D, Sep. 22, 2009, 3 pages.

Bicocchi et al., "Context-Aware Coordination in the Sensors' Continuum", Ubiquitous Computing and Communication Journal, CPE—Special Issue,—ISSN 1992-8424,2008, pp. 1-12.

Nixon et al., "Coordinating Knowledge in Pervasive Environments", Ubiquitous Computing and Communication Journal, Jan. 2007, Conference: 16th IEEE International Workshops on Enabling Technologies: Infrastructures for Collaborative Enterprises (WETICE 2007), Jun. 18-20, 2007, Paris, France, pp. 1-13.

IBM, "Supporting Namespaces in Meta-Models That Have No. Direct Namespace Support", IP.com, IPCOM000021493D, Jan. 21, 2004, 6 pages.

Murphy et al., "LIME: A Coordination Middleware Supporting Mobility of Agents and Hosts", Washington University in St. Louis, Department of Comuputer Science & Engineering, St. Louis, MO, 63130, Apr. 7, 2003, pp. 1-28.

Carbunar et al., "Coordination and Mobility in CoreLime", Math. Struct. in Comp. Science, received Mar. 9, 2002, pp. 1-24.

Rossi et al., Tuple-based technologies for coordination, Apr. 8, 2005, pp. 1-27.

Papadopoulos et al., "Coordination of Distributed and Parallel Activities in the IWIM Model", International Journal of High Speed Computing 9(02):127-160 • Jun. 1997, pp. 1-37.

Jagannathan, "Optimzing Analysis for First-Class Tuple-Spaces", Department of Computer Science, Yale University, New Haven, CT 06520, MIT Press, 1991, pp. 1-23.

\* cited by examiner

SHARING TUPLES ACROSS INDEPENDENT COORDINATION NAMESPACE SYSTEMS

STATEMENT REGARDING FEDERALLY SPONSORED RESEARCH OF DEVELOPMENT

This invention was made with U.S. Government support under Contract. No. B621073 awarded by the Department of Energy. The government has certain rights to this invention.

FIELD

The present invention generally relates to distributed memory architectures and memory management, and particularly a hardware acceleration mechanism for providing a federation service for tuple data storage at nodes sharing tuples across multiple independent CNS namespace systems and enabling a federated database.

BACKGROUND

A "Federated" database system is a meta-database management system which transparently maps multiple autonomous database systems into a single federated database. The constituent databases are interconnected by a computer network and the various databases could employ different query languages. Data may also be distributed among the different databases. The federation layer presents a single interface to a user and identifies the location of the data in one of the databases and retrieves it for the user. The load on a very large data base becomes distributed across multiple databases.

SUMMARY

A hardware accelerated system and method for supporting a federation service for plural coordination namespace (CNS) systems implementing distributed key-value (tuples) memory storage (databases).

The system and methods provide key-value data storing operations, including federating and sharing of key-value data tuples across nodes and processes across multiple coordination namespace implementations.

A system and method supporting a sharing of tuples issued by processes of a multi-node computing system implementing plural CNS systems.

A system and method providing a "gatekeeper" process at any one node of a multi-node computing system implementing one or more CNS systems for supporting a sharing of tuples issued by processes of the multi-node computing system implementing plural CNS systems.

In one aspect, there is provided a federation system for tuple data storage at nodes implementing multiple independent coordination namespace systems (CNS) extended memory systems. The system comprises: one or more data generated by local processes running at distributed compute nodes across the multiple independent CNS extended memory systems, the data stored as tuple data associated with a tuple name; and a controller circuit associated with a requesting node associated with a local CNS system of the multiple independent CNS extended memory systems, the controller circuit having a hardware processor configured to perform a method to: receive a request for a tuple data from a local process running at the requesting computing node implementing the local CNS system; determine whether a tuple comprising requested tuple data exists for the requesting local process at the local CNS extended memory system; in response to determining a requested tuple data for the local process does not exist in the local CNS system, broadcast a first read request over a network to one or more remote gatekeeper processes, a remote gatekeeper process running at a respective remote node associated with a respective remote CNS storage system, the broadcast read request indicating a request for the tuple data in a remote CNS storage system; receive from one or more of the remote gatekeeper processes running at the respective remote nodes, a response indicating whether the tuple data exists at the respective remote CNS storage system; and in response to the receiving respective indications that the requested tuple data exists at the remote CNS storage system, selecting a particular remote gatekeeper at a remote node of a respective remote CNS storage system to provide the local process with the requested tuple data; communicate a request for the data to the selected remote gatekeeper process; and receive from the selected remote gatekeeper process running at the remote node, the requested tuple data for storage at a node in the local coordination namespace (CNS) system for use by the requesting local process.

In a further aspect, there is provided a method for federating tuple data for multiple connected independent coordination namespace systems (CNS) extended memory systems. The method comprises: receiving, using a processor at a local coordination namespace (CNS) extended memory system, a request for a tuple data from a local process running at a requesting computing node implementing the local CNS system; determining, using the processor, whether a tuple comprising requested tuple data exists for the requesting local process at the local coordination namespace (CNS) extended memory system; responsive to determining a requested tuple data for the local process does not exist in the local coordination namespace (CNS) system, broadcasting, using the processor, a first read request over a network to one or more remote gatekeeper processes, a remote gatekeeper process running at a respective remote node associated with a respective remote CNS storage system, the broadcast read request indicating a request for the tuple data in a remote CNS storage system; receiving, at the processor, from one or more of the remote gatekeeper processes running at the respective remote nodes, a response indicating whether the tuple data exists at the respective remote CNS storage system; and responsive to receiving, at the local processor, respective indications that the requested tuple data exists at the respective remote CNS storage systems, selecting a particular remote gatekeeper at a remote node of a respective remote CNS storage system to provide the local process with the requested tuple data; and communicating, using the processor, a request for the data to the selected remote gatekeeper process; and receiving, at the processor, from the selected remote gatekeeper process running at the remote node, the requested tuple data for storage at a node in the local coordination namespace (CNS) system for use by the requesting local process.

The present invention is advantageously employed in a multiprocessing computer system having a plurality of processor devices each competing for access to shared memory structures, however, can easily be adapted for use in multi-core uniprocessor computer systems.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
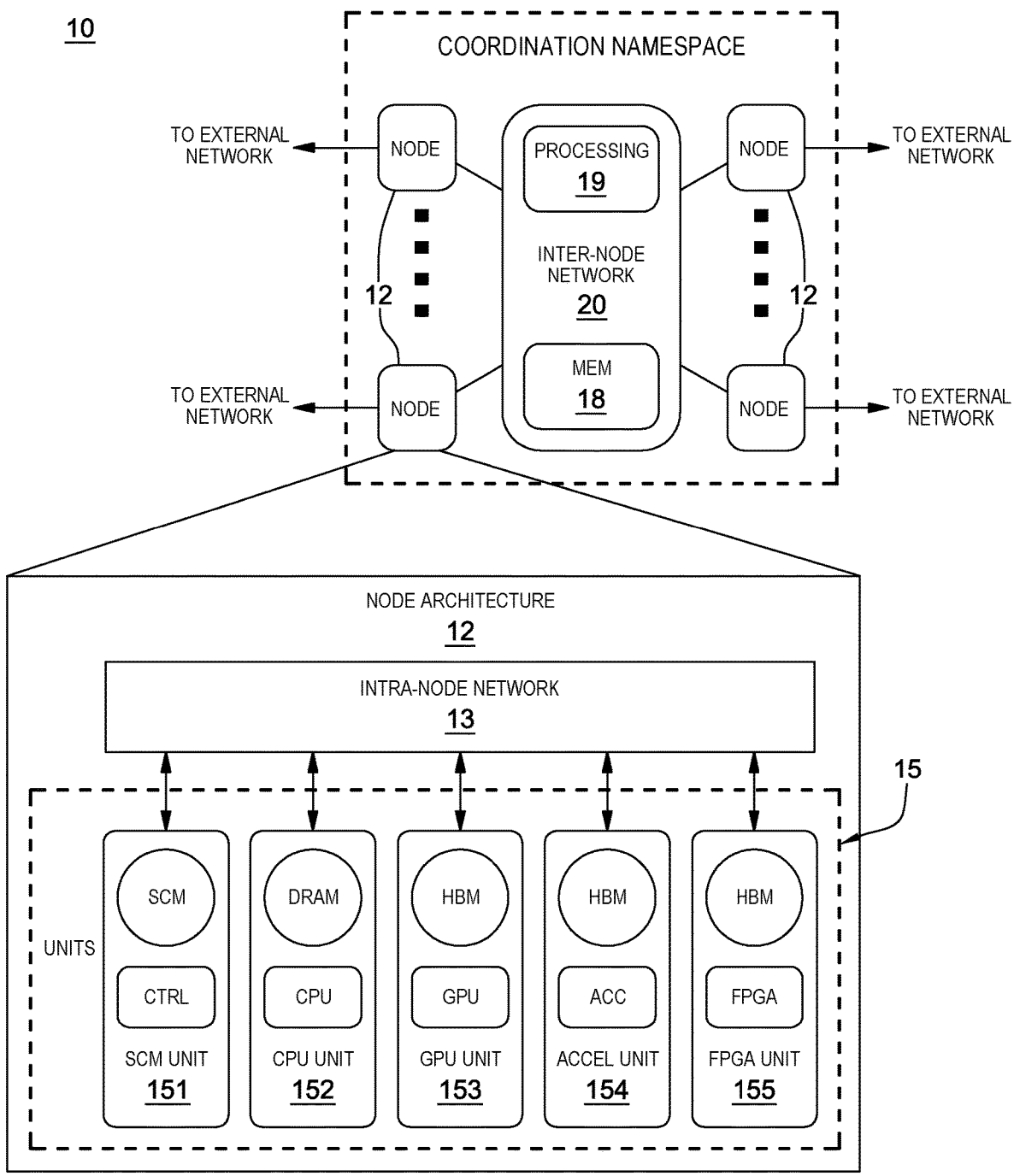
FIG. 1 illustrates an extended memory architecture constructed using a node architecture of multiple processing nodes in which the present systems and methods are employed according to embodiments herein.

The present disclosure provides a hardware acceleration mechanism to support operations for sharing of tuples issued by processes of a multi-node computing system having an extended distributed memory implementing plural coordination namespaces (CNS).

According to embodiments, a system and method provides an architecture for federating multiple CNS systems to enable sharing Named Data Elements (NDEs) or "tuples" created therein.

In an embodiment, the description makes use of and extends the Coordinated Namespace (CNS) system and methods described in commonly-owned, co-pending U.S. patent application Ser. No. 16/217,905 entitled Coordinated Namespace Processing, the whole contents and disclosure of each of which are incorporated herein by reference as if wholly set forth herein. The description further makes use of and extends the systems and methods described in commonly-owned, co-pending U.S. patent application Ser. Nos. 15/851,480 and 15/851,511, both entitled Data Shuffling With Hierarchical Tuple Spaces and incorporated by reference herein. The description further makes use of and extends the Coordinated Namespace (CNS) system and methods described in commonly-owned, co-pending U.S. patent application Ser. No. 16/719,397 entitled Tuple Checkout with Notify in Coordinated Namespace Processing, the whole contents and disclosure of each of which are incorporated herein by reference as if wholly set forth herein, and commonly-owned, co-pending U.S. patent application Ser. No. 16/719,340 entitled Interlinked Tuples in Coordinated Namespace, the whole contents and disclosure of each of which are incorporated herein by reference as if wholly set forth herein.

The following are abbreviations of terms representing entities involved in the various system and methods herein for federating a distributed tuple data storage systems across multiple CoordinationSpace (CS) or CoordinationNameSpace (CNS) systems.

A Named Data Element (NDE) is a tuple record having meta data including tuple name, size, location, pointers and tuple data.

An ActualHome (AH) or Home, is a node where the named data element (tuple) is actually stored.

A NaturalHome (NH) is the node identified from the hash applied to the tuple name.

A PreferredHome (PH) can be the NH or identified from a user-specified group. The PH for csOUT identifies where to place the tuple and for a csIN where to look first for tuple.

A HashElement (HE) refers to a single (one) record per unique name in CNS, e.g., one HE for one or more tuples of the same name.

A PendingRecord (PR) is a tuple record that identifies a pending request for a tuple that has not been created.

A LocalTuple (LT) represents a metadata record and associated data at the actual home.

A RemoteTuple (RT) represents a metadata record at the NH identifying a tuple homed elsewhere.

Storage class memory (SCM) is any byte-addressable persistent memory.

A Work queue (WQ) is a hardware work queue processed by a hardware work queue manager (WQM). A tuple engine is activated by the WQM to process the tuple request in the WQ. The work queue manager, work queue and tuple engines can be implemented in a programmable core or any computing device or circuit structure running a microcode logic circuit implementation to implement the work queue/ tuple engines. Alternately, the work manager functions can be a programmable accelerator implementing these functions.

FIG. 1 depicts a schematic diagram of a multi-node computer system in which a federation service for tuple storage across multiple CNS systems is employed. FIG. 1 is particularly illustrative of an extended memory architecture 10 constructed using a node architecture of multiple processing nodes 12. At the conceptual level, this architecture enables constructing a system from "units" 15 that combine memory pools and processing capability. In an embodiment, multiple types of units 15 are possible. A node 12 may contain a single unit or multiple units 15. Examples of units 15 in a node, may include a memory service unit (Storage Class Memory Unit) 151, a Sequential Processing unit (e.g., a DRAM and CPU) 152, a Throughput Processing unit (High Bandwidth Memory and Graphic Processing Unit (GPU))) 153, and acceleration unit 154 or circuit unit 155.

In an embodiment, each of the units 15 are independent and treated as peers under the extended memory architecture 10. These units may be optimized for specific computational and memory task. The architecture depicts a collection of units where intra-node network 13 provides an efficient coherent interconnect between the units within a single node 15 and Inter-node network 20, e.g., Ethernet or Infiniband® or like network, interconnecting the computing nodes 12 within the system 10. Similar to a unit, the Inter-node Network 20 may also contain memory 18 and associated processing 19. The "external networks" identify access beyond the extended memory architecture 10.

In embodiments, methods are implemented for dynamically creating a logical grouping of units from one or more Nodes 12 to perform an application, wherein at least one of these units can run an operating system including a master process (not shown) that can setup the CNS system to run on a system of nodes. The units 15 may be, for example, a combination of general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a node 12 to an application. A system manager (not shown) may schedule jobs that run over the full set of nodes in the system, start jobs (applications or workflows), and assign the resources at job launch when the required resources are available.

As described in herein incorporated co-pending U.S. patent application Ser. No. 16/217,905, the content and disclosure of which is incorporated by reference herein, the extended memory (EM) architecture 10 architecture for accessing memory beyond a node 12. The EM architecture includes a method for accessing memory distributed over the full or subset of the system referred to as Coordination Namespace (CSN) method. Nodes within the extended memory architecture have major characteristics: (1) Capable of being managed by a single operating system; (2) Efficient coherent load/store access to all memory pools within the node; (3) a Global Virtual Address Space for referencing memory pools inside and outside the node; and (4) access to a system wide Coordination Namespace.

As described in commonly-owned, co-pending U.S. patent application Ser. No. 16/217,905, the Coordination Namespace (CNS) is a hardware system implementing methods providing support for treating system memory or storage class memory as a key/value store with blocks of data referenced using a "name" or key.

Figure 2:
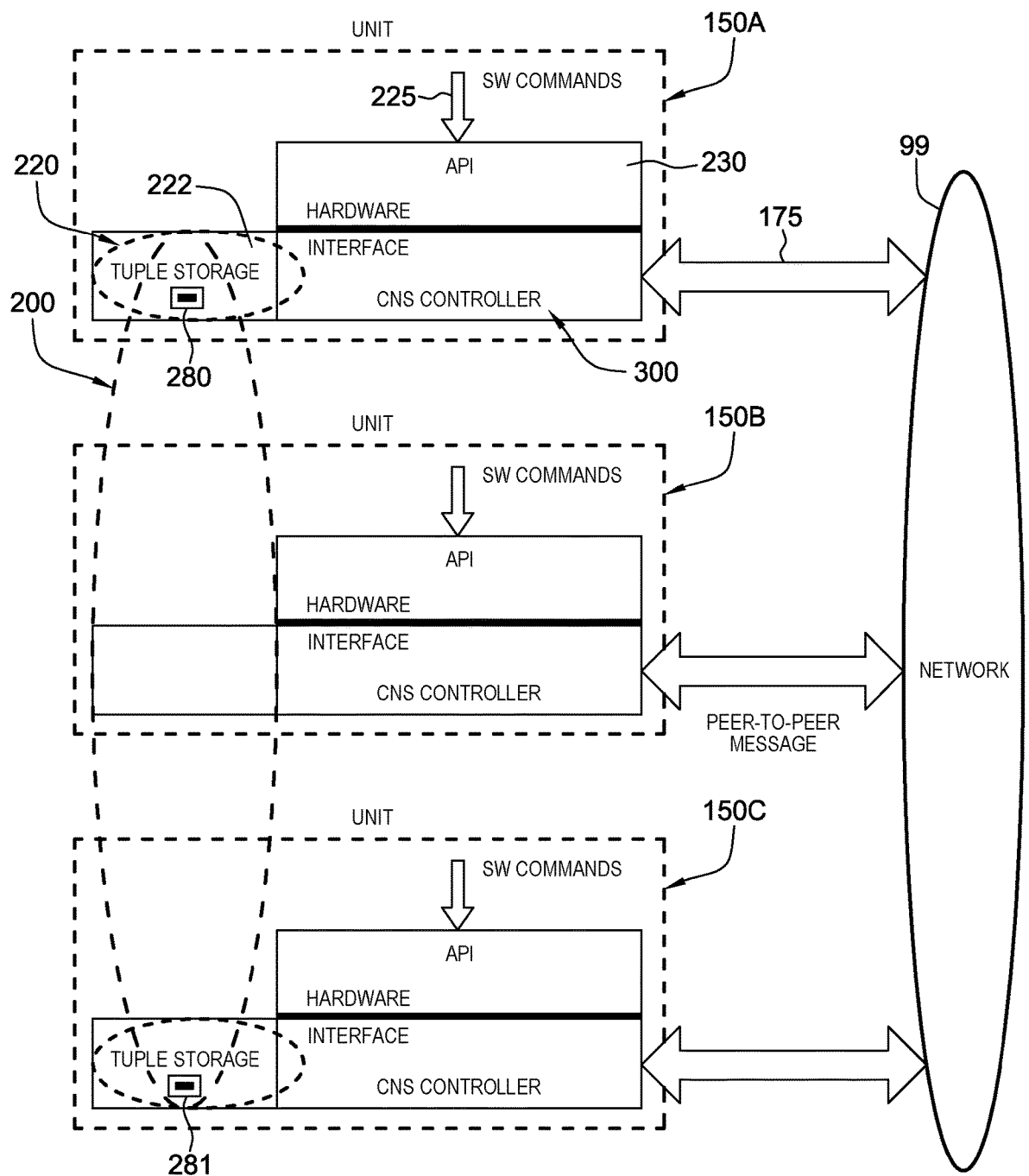
FIG. 2 shows a CNS architecture depicting networked connection of units across one or more nodes of the extended memory architecture of FIG. 1.

FIG. 2 shows a CNS architecture 100 depicting networked connection of units 150A, 150B, 150C . . . etc. across one or more nodes of the extended memory architecture 10. In an embodiment, units 150A, 150B, 150C etc. are independent and treated as peers under the extended memory architecture. These units can be for example, any combination of processors, programmable logic, controllers, or memory optimized for a specific computational/memory task. The architecture 100 depicts a collection of units where inter-node network 20 provides an efficient coherent interconnect between the units across the system.

In an example embodiment, each unit 150A, 150B, 150C . . . etc. contains a pool of memory that is divided into one or more regions each having one of three designations: (1) Globally accessible; (2) NDE storage 220; and (3) Local 222. One embodiment of the extended memory architecture may aggregate memory regions designated as globally accessible into a Global Virtual Address Space and allocate memory regions designated as NDE storage to a distributed Coordination Namespace 200.

FIG. 2 conceptually depicts the Coordination Namespace storage system 200 distributed across units 150A, 150B, 150C . . . etc. in the extended memory architecture. Units, e.g., unit 150B, do not have to contribute to storage. Units 150A, 150B, 150C . . . etc. can access CNS 200 even if not contributing storage.

As shown in FIG. 2, the plural units distributed across nodes of the extended memory architecture include at least one hardware CNS controller 300 that provides access to the Coordination Namespace. The CNS storage structure 200 provides an alternate view of extended memory that is separate from a processes' virtual address space local to the unit. In the Coordination Namespace, references to extended memory use a "name" for accessing a finite, ordered list of immutable values referred to as a Named Data Element (NDE) or "tuple". In an exemplary embodiment, the first field associated with every NDE is its name, a character string with an implementation dependent maximum length. The "name" references a NDE located in the Coordination Namespace. The "name" can simply be the first field, the name, a search template for any set of the fields in the NDE, and the like and referenced herein as a "name," a "key," or as a "NDE-name." The Coordination Namespace allows access to NDEs contained within a distributed object store. As shown in FIG. 2, peer-to-peer messaging over network links 175 across network 99 is used for accessing remote NDEs (tuples). In an embodiment, network 99 is a combination of the intra-node network 13 and inter-node network 20 of FIG. 1.

In embodiments, each unit contributing storage is an owner of a set of "groups" segments of the Hash of the "name". CNS storage can be located in system memory or a Storage Class Memory (SCM), or in a File System. The CNS is accessed using software commands 225 received via an application programming interface (API) 230 and forwarded to the CNS controller 300. The CNS controller is completely implemented in software if CNS storage is file system based.

The extended memory architecture uses NDEs or "tuples" within the Coordination Namespace system architecture 100 to communicate work between applications. In order to manage the Coordination Namespace, the system may also be associated with a CNS server that manages a Coordination Namespace located in a distributed manner across all or subset of the memory elements of the system. The part of the memory of the system associated with the Coordination Namespace is referred to as the Coordination Namespace memory 200. Parts of this memory may be in the nodes executing the applications, other parts may be in memory dedicated to the coordination namespace. The Coordination Namespace addresses the challenges of moving data between phases of a workflow by providing an efficient means for communication between and coordination of the applications within a workflow. In addition, the Coordination Namespace also addresses the need for keeping certain types of data persistent in memory longer than the duration of a single program or application.

In FIG. 2, one of the CNS controller elements 300 is CNS Server used for accessing the Coordination Namespace memory. The CNS server in particular manages the Coordination Namespace located in a distributed manner across all nodes (each node can have its own CNS server, CNS client, or both) of the system contributing to the distributed memory. A node may contribute all its memory to the Coordination Namespace (node is a dedicated CNS Server), parts of its memory or none of its memory. A node may still access the Coordination Namespace 200 even if not contributing any of its memory. The parts of the memory of the system associated with the Coordination Namespace may also be referred to as the Coordination Namespace memory or distributed memory. Various NDEs, such as NDE 280 and NDE 281 may be located in the distributed memory. In order to process Coordination Namespace Requests such as creating and reading NDEs a hashing of a named data element name (key) at a requesting client yields information about the node at which the named data element is located. This provides a single hop mechanism to locate an NDE.

In an embodiment, CNS Server characteristics include the use of a Hash table to manage tuples owned or naturally homed. In embodiments, a single hash table is provided per CNS node. Additionally, as multiple coordination namespaces can run concurrently on a node, there is more than one hash table per CNS node. Each unit has independent hash tables. There is further provided a Tuple memory in storage class memory and CNS data structures in a CNS Controller DDR. A CNS server uses a virtual address space local to the unit for accessing Tuples storage.

A CNS client is provisioned with request queues for locally initiated commands with one queue per process (e.g., allowing access to any open CNS).

In embodiments, example access methods provided by the extended memory architecture include, but are not limited to: (1) Direct load/store access to memory located within a node. (2) An asynchronous copy method. (3) A NDE access method. The NDE access method provides a set of commands to create, read, retrieve, and destroy NDEs in the Coordination Namespace.

When accessing the Coordination Namespace, the CNS controller (e.g., Client or Server) applies a distributed hash function on the NDE-name to locate the data and perform the data movement. A CNS Server allows access to NDEs in a distributed system in a similar way as load-store instructions in an instruction set allows access to locations in a virtual address space. Furthermore, these NDEs are located beyond an application's virtual address space. NDEs and data in the Global Virtual Address Space may persist beyond the tenure of the application.

In embodiments, each node 12 of EM 10 includes components running methods for implementing a federation of multiple CNS distributed tuple memory storage systems implementing plural coordination namespaces (CNS).

Figure 3:
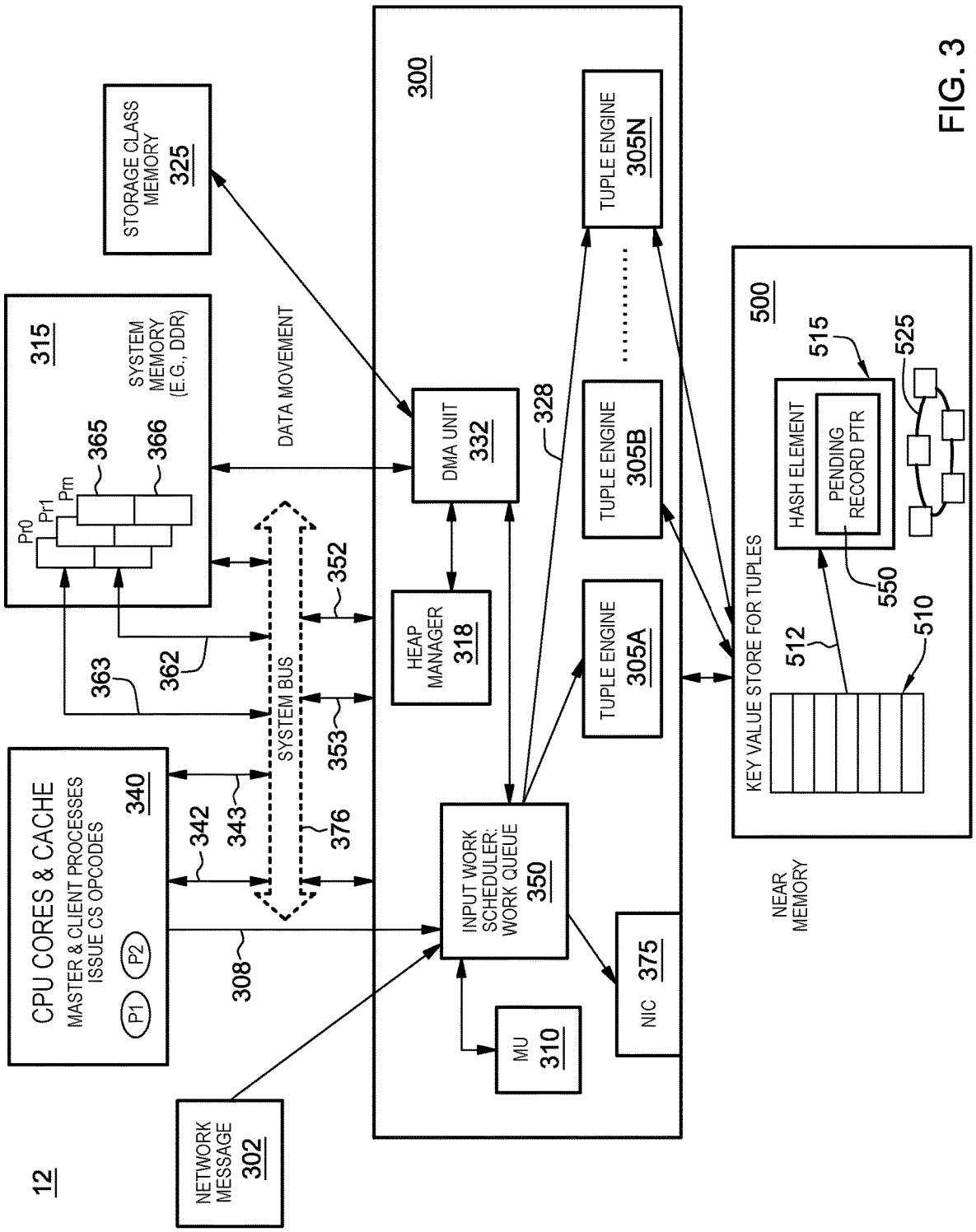
FIG. 3 schematically depicts a high-level schematic of a CNS controller for managing tuples (NDEs) in a federation of coordinated namespace systems of FIG. 2 implementing operations supporting a federation of tuple data.

FIG. 3 schematically depicts a high-level schematic of a CNS controller 300 at a processing node 12 for managing the enable sharing of NDEs or tuples (key-value stores) generated by processes running at nodes in the multi-node computing system in support of federating the plural CNS tuple storage systems. In embodiments, the controller 300 is a microcoded logic circuit implementation and is seen as an accelerator to process the requests offloaded by a CPU 340.

In FIG. 3, CNS controller 300 at a node 12 includes one or more tuple engines 305A, 305B, . . . , 305N which are hardware units providing the processing to perform searches for tuples or create/delete tuples as needed in a near memory structure 500 (e.g., a local DDR memory). The tuple engine performs a hash of the tuple name to locate the node designated as the natural home. In embodiments, tuple engines respond to commands issued by work manager/scheduler 350. In an embodiment, each tuple engine is responsive to a received API request, determines whether a hash element and a tuple record associated with the specified tuple name exists and, if a tuple record exists, retrieves tuple record/data and returns the data to a requesting process. A completion record is sent back to the requesting process following the data retrieval. Otherwise, it will create a new hash element for the specified tuple name and create a pending record for for association with that hash element by linking the pending record to a circular doubly linked structure of local tuples.

Each tuple engine hardware unit 305A, 305B, . . . , 305N updates local DDR data structure 510, HE, PR, LT, and RT. Further, each tuple engine: supports creating of pending records when a request for a tuple is made before the tuple has been added to the CNS system by another process; supports creating of pending notify records when a tuple has been read by a remote process which requests notification if the tuple gets removed; and supports processing as it pertains to sharing of tuples generated by remote processes at remote nodes in the multi-node computing system having an extended memory to support federating of tuple storage systems across plural CNSs. That is, apart from creating/searching/deleting a hash element and/or tuple record—the tuple engine further shares tuples across a federation of multiple CNS systems or share tuples with another type of system (e.g., a non-CNS system) that need to interact with the CNS system that has the tuple.

In an embodiment, near memory 500 can be a separate DRAM memory that has lower latency with respect to the tuple engines or it can be a partition within a system memory 315. The storage class memory 325 can also be another partition within system memory. A Heap manager element 318 is invoked to allocate/free memory in storage class memory.

In an embodiment, the work manager/scheduler 350 receives/processes software requests 308 (i.e., CNS opcodes) issued by CNS server and/or CNS client processes, e.g., CPU cores, and issues new work to the different Tuple processing engines 305A, 305B, . . . , 305N over a ring/bus structure or multiplexor 328. The work requests may be queued in an associated WQ (not shown).

In embodiments, near memory 500 can be a RAM (e.g., DDR3) that stores a hash table 510 that, instead of hash array element values, contain pointers, such as head pointer 512 that points to a first HE 515 and a linked list structure 525 that record the location of tuples or pending requests waiting for tuples. Such a linked list structure 525 may be pointed to by a pending record pointer 550 included in hash element 515. Tuple engines 305A, 305B, 305N traverse the hash table 510 and linked list structures 525 to search, insert or delete tuple records. By calculating the hash of a tuple name, there is provided an index into the table 510 which provides the head of the linked list (i.e. the first item in each list 525 of tuple records).

A direct memory access (DMA) memory processing unit 332 is configured to move data between the system memory and storage class memory. DMA unit 332 further enables the various CNS controller hardware components to access system memory (random-access memory) 315 and/or storage class memory 325 and enable transfer of tuple data between storage, SCM and near memory 400 or vice versa independent of any central processing unit (CPU).

A messaging unit 310 is implemented for supporting the message structure for multi-node operations to create and share tuples in a federation of multiple CNS systems.

A network interface card (NIC) 375 is provided that interfaces the CNS controller unit 300 to an external network for inter-node communications. For instance, notification messages may be sent by the CNS controller via the NIC 375 over a network to a notify queue 360 and a monitoring queue 362 associated with each process at computing nodes in response to when the tuple record(s) the process has previously read is(are) attempted to be removed and/or modified from the coordination namespace by other processes. When a process wants to be notified about changes to a tuple in the coordination namespace, it puts and entry for it in the monitoring queue and notifies the CNS controller that it needs to be notified on removal/changes to the particular tuple. When another process attempt to remove/add a tuple by that name, the CNS controller sends a notification to the process that requested notification. This notification is placed in the notify queue. The process then compares the notification entry with what is in its monitor queue and makes a determination if it needs to take further action on the tuple.

In embodiments, work manager element 350 receives the CNS software requests (e.g., opcode) 308 from master and client processes running on CPU and caches 340 and keeps track of the creation and deletion of the tuple record(meta data), and notify a client process of tuple creation/deletion including a setting up notification of a tuple record before its even created in the CNS system. In an embodiment, the work manager 350 can receive request messages, e.g., tuple commands 302, over the network from other nodes to initiate tuple sharing and CNS gatekeeper operations in the federation of CNS systems. The work manager 350 further implements process for notifying DMA unit 332 to transfer tuple data depending on the CNS opcode being processed.

Further included as part of the system memory 315 in the CNS node architecture 12 is a request queue 365 in which local processes write a request, and a completion queue 366 which are created at the start of the coordination namespace system. A single request queue and completion queue is provided for each user process, e.g., processes labeled pr0, pr1, . . . , prn. In an embodiment, the completion queue 366 is placed consecutively after the request queue 365 array in system memory. Every node also provides for incoming and outgoing queue for messages. These queues are managed by the network process and the CNS controller has access to them. These queues are for node to node communications within the CNS system. Apart from these, the node where the gatekeeper process is running will also have an outgoing and incoming queue pair for communicating with each remote CNS systems or other non-CNS systems. In an embodiment, a node is selected to operate the gatekeeper process during a CNS system setup. When the gatekeeper process attaches to the CNS system, it provides its outgoing queue and incoming queue pairs in lieu of the request/ completion queues done by other clients. When one gatekeeper process serves more than one remote CNS system, that gatekeeper process would need one queue pair per remote system.

In an embodiment, user processes running in a CPU core 340 issues write commands to a request queue via system bus 376 providing data transfer amongst the CPU, system memory and CNS hardware controller 300. As the CNS controller hardware may not know about this new request being inserted in system memory, the process performs writing to a memory mapped IO address (MMIO address) a value—which could be the updated tail pointer of the queue that contains the request. The hardware monitors the MMIO bus and upon seeing an address belonging to it—and the corresponding value that came with the address—it compares the value with its known head pointer of the queue. If the new tail is greater than the head—then it knows that a new request has been inserted in the queue. It then proceeds to issue a load on the address corresponding to the tail pointer. If tail pointer was incremented by more than 1—then hardware loads head ptr+1, until it reaches tail of the queue. The MMIO bus carries data in packet of multiple beats. The first beat would have the address of the MMIO, and the subsequent beats have the data associated with the address.

Thus, every time a user process issues a request message 342 into the request queue 363—a MMIO doorbell is rung to the hardware for processing. Via messaging 353, 363 over a system bus, the CNS hardware controller 300 picks this request from the request queue 365 and processes it while the user process waits for the processing to complete. When the hardware/controller completes processing the request, it issues a completion notification message 352, 362 into this completion queue 366 for that process. The user program/ processes further polls 343 via the system bus 376, this completion queue 366 for new completions. When it finds one, it clears the corresponding request from the request queue. The completion entry in the completion queue informs the user process which request got completed and some status and error messages. In an embodiment, an aggregate value from tuple reduce operations could also be included in this completion message, or it could have been in a predefined location that was indicated in the original request. The user process picks the value from this predefined location. The hardware has updated the aggregation value at this predefined location as part of its processing.

Figure 4:
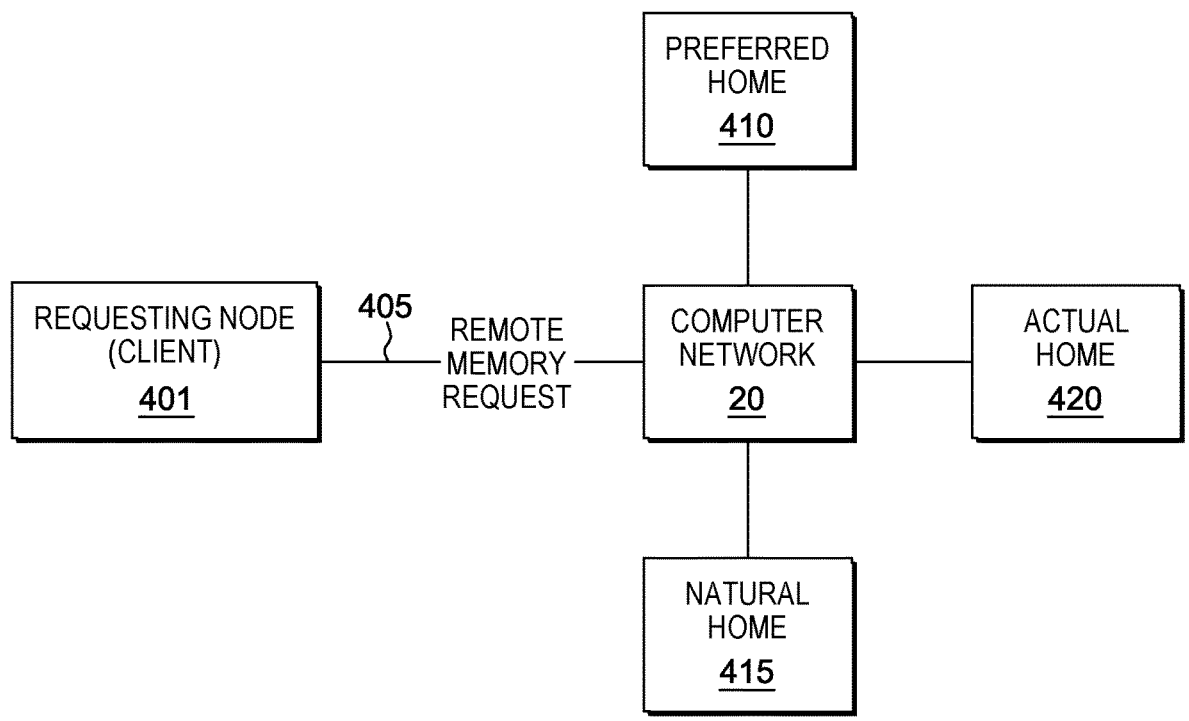
FIG. 4 shows a diagram depicting the homing of a tuple in a Coordination Namespace (CNS)

FIG. 4 shows a diagram 400 depicting the homing of a tuple in a Coordination Namespace (CNS). With respect to running a workflow or application, a requesting Node (e.g., client 401) is the location running the process making the remote memory NDE request 405, i.e., the unit 15 making the tuple command, e.g., including the tuple key or "name". At the CNS controller, the hash algorithm is applied to the tuple-name to identify the Natural Home 410. The Natural Home directly or indirectly indicates the node where the NDE is created or may be found if no other information is provided. The Preferred Home 415 may be provided by the process making the request or by prediction algorithm, e.g. running at the CNS client, for example, by an affinity parameter. The preferred home node can be a desired location, e.g., specified by a user. When supplied, the Preferred Home 415 directly or indirectly indicates the node where the NDE should be created or where to first search for the NDE. The Actual Home 420 identifies the node where the NDE resides. When creating a NDE, the Preferred Home (node) is tried first. If the tuple cannot be created there for some reason, such as out of memory an alternate home is chosen, and that node becomes the Actual Home. When a NDE is created, the Natural Home 410 always keeps a record in the local hash table indicating the Actual Home but does not store the data. In embodiments, a PH could also be the tuple's natural home (based on the hash of the name). The Natural home node will always receive the tuple based on its key hash and make and add an entry in it. When a NDE is requested, the hash table on the Preferred Home (node) 415 is searched first. If the NDE is not found, the request is sent to the Natural Home for recording the dummy pointers for the associated key. The nodes identified by the Natural, Actual, and Preferred Homes can all be different, the same, or any combination. In addition, they can also be different or the same as the requesting node. The communication between the requesting node, the Natural Home, the Preferred Home, and the Actual Home is performed via a the inter-node Network 20.

Figure 5:
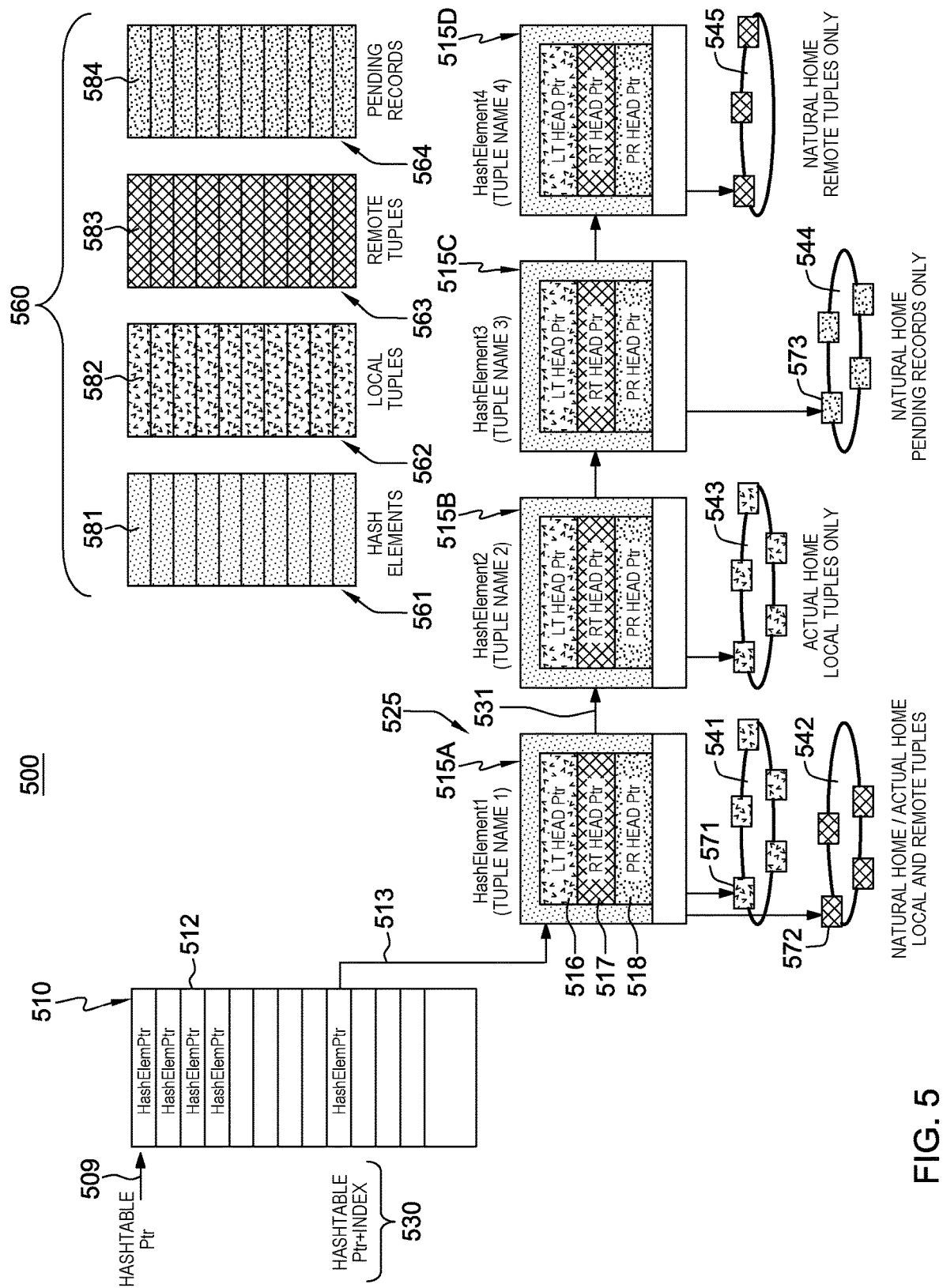
FIG. 5 depicts in greater detail the DDR hash structures in a near, or a partition in system memory implemented in CNS memory at a distributed node.

FIG. 5 depicts an implementation of a DDR hash structures in a near memory 500 (e.g. dynamic RAM (DRAM) memory or double data rate RAM (DDR)) or a partition in system memory, used for hardware support of the federation of tuple database operations in multiple coordinated namespace architectures. In embodiments, the nodes 12 include a local or near memory of the CNS extended memory architecture.

As shown in FIG. 5 a unit 500 provides the hash table 510 in the dynamic RAM (DRAM) memory or a DDR memory, with the hash table 510 containing fixed size structures in the form of a hash table map including hash element pointer entries 512, that point to a corresponding linked list array structure 525 maintaining a linked list of pointers to various types of tuples (e.g., LT, RT and PR) stored at memory locations in the CNS extended memory. In particular, a tuple pointer (HashElemPtr) 512 points to a head pointer of the linked list 525.

In an embodiment, the hash table 510 is initially accessed by a pointer 509 based on a part of the hash value of a tuple name of a received sorting operation tuple command. The hash table map data structure 510 implements a hash function to further compute from the hash value of the tuple name a pointer index 530 for accessing a particular memory pointer element in the table 510 of memory pointers. The hash element contains the key of a tuple key-value pair. While multiple tuple keys or "names" can hash to a same index, they are linked as a linked list 525 of hash elements 515 in a linked list structure 525.

For example, as shown in FIG. 5, a HashElemPtr memory pointer 513 points to a first hash memory element, i.e., a first element 515A of a linked list 525 of tuple storage locations in memory 500 which can be used for memory read or write operations in the CNS extended memory. That is, instead of each hash array element values, each item in the hash table map data structure 510 is simply the head pointer 513 to a first hash element item in a linked list 525. By calculating the hash of the received tuple name, there is provided an index 530 into the array table—which in provides the head 513 of the linked list (i.e. the first item in linked list 525).

In embodiments, each hash element 515 in that linked list 525 would correspond to a unique tuple name, and it is possible to have multiple tuples for the same name, i.e., each hash element 515 is searched to find a tuple name (1 per hash element) and within each hash element 515 is three lists: list of local tuples (actually stored on that node), a list of remote tuples (if the node is NH for that name), a list of tuples that are known that exist somewhere else, and in an event that a request for the tuple came before the data is actually provided, e.g., by receiving an CNS "IN" opcode prior to receiving an CNS "OUT" opcode, the request is saved in a pending record. Each linked list 525 is a linked list of hash elements, with each hash element 515 including one or more of: a pointer 516 to connect to the local tuple(s) list, a pointer 517 to connect to a respective linked list structure of remote tuple(s), and/or a pointer 518 to connect to a respective linked list structure of pending record(s) all for the same tuple name, as well as a next pointer 531 to a following hash element 515 in that linked list 525. Linked list 525 include tuples that hash to the same Hash Table index where each element in the list corresponds to a unique tuple name.

Each of the local tuples/remote tuples/pending records connected to the given hash element 515 are connected themselves as circular doubly linked structures. Thus, as shown in FIG. 5, there are three (3) possible combination of allocation of tuple records in memory 500 as circular doubly linked structures including: 1) a circular doubly linked list structure 541 of local tuples for a given unique name stored in memory allocated on the node (including NH and AH tuples) as pointed to by hash element 515A; 2) a circular doubly linked list structure 542 of remote tuples for a given unique name that are NH on the node and pointed to by hash element 515A, but the data is actually stored on a different node; and 3) a circular doubly linked list structure 544 of pending requests for NH tuples of a given unique name that have not been created (e.g., only pending records present for a given tuple—indicated for the natural home as pending records (PR) cannot be present in actual homes). As shown in FIG. 5, a circular doubly linked structure 543 is formed with only local tuples present—indicating for actual home local tuples only as pointed to by pointer in hash element 515. Further, a circular doubly linked list structure 545 of only remote tuples if only remote tuple list is present for a given tuple name—its the natural home for that tuple, as pointed to by pointer in hash element 515D. In additional embodiments, a combination such as a NH=AH can exist such that both LT list and RT list would be maintained in the same node (e.g., both the natural home and actual home for the tuple), e.g., as pointed to by pointers in hash element 515A.

Thus, as further shown in FIG. 5, the LT head pointer 516 of hashelement1 515A associated with a first tuple name points to a head 571 of double-linked circular list structure 541 of local tuples and the RT head pointer 517 of hashelement1 515A associated with a first tuple name can point to a head 572 of double-linked circular list structure 542 of remote tuples. Similarly, the PR head pointer 518 of hashelement1 515C associated with a third tuple name points to a head element 573 of double-linked circular list structure 544 of pending records. It is understood that a head tuple of the pointers can represent a new hash element taken from free pointer list memory buffers 560 to record a first open tuple element for that name responsive to a CSOut( ) tuple command without a corresponding entry in hash table 510. When the hash table is searched, and a hash element is already found for the processed tuple name, then the linked list structure is formed by appending a new record for commands received for that same tuple name.

In an embodiment, as shown in FIG. 5, at a node, the data value part of the tuple is stored in near memory and are pointed to by a data pointer field in the created tuple record. The local tuples themselves are pointed to by a pointer as indexed in the hash element corresponding to the tuple name in the CNS structure at a node shown in FIG. 5. Using a local DRAM memory, there is locally stored tuple values. If data size is small, e.g., on the order of 64 bits, performance is improved by storing this tuple value data locally within the local tuple itself in the form of immediate data.

Further, as shown in FIG. 5, there are corresponding four (4) types of free list memory buffers 560—one for each type that is needed to form these linked list structures 541, 542, and 544 and one for the linked list of hash element 525 where a hash element is for each unique name that hashes to a hash table index. In an embodiment, a tuple engine traverses the hash table based on a received tuple name and accesses the linked list structures to search, insert or delete tuple records. When a tuple engine needs to create an entry in these linked structures—the tuple engine retrieves a new element from the free list 560 corresponding to the linked structure type. As shown in FIG. 5, a tuple engine can pick an entry for a linked list structure from free lists associated with hash element type 561, local tuples type 562, remote tuples type 563 and pending records type 564.

In embodiments, fields for the linked list associated with hash element type 561 include a head of linked lists for local, remote and pending tuple records. In an embodiment, the CNS controller contains a head pointer for each free list type: hash element, local tuple, remote tuple, and pending records. Each element in the free list include a set of pointers linking together the free elements. For example, free list element 581 associated with hash element type 561 include: a set of pointers, e.g., a pointer to address of next HashElem, a pointer to an address of a previous HashElem, an address of a HashTable parent (i.e., the hash index), and head pointers for each type of tuple record linked list, e.g., pointer to an address of a first element in PendingReq list (pending request), pointer to an address of a first element in LocalTuple list, and pointer to an address of a first element in RemoteTuple list of that tuple name, etc. When a tuple engine needs a new hash element for a NDE, it removes the first free hash element 581 and adds the element to the linked list 525. The tuple engine then removes the first free tuple record type required (e.g., 582, 583, 584) and fills in associated pointer in the new hash element, e.g., 515A, thus creating a tuple record for the new NDE.

Further, the fields 582 in free lists associated with Local Tuples type 562 include information for creating the linked list. For example, for LT linked list 541: fields include a pointer to a tuple address in SCM, a pointer to an address of the next LocalTuple, a pointer to an address of a previous LocalTuple, a pointer to an address of a HashElem parent, etc. Additional information is provided including information needed to recreate the pending request for the tuple when the tuple is created, e.g., an address of actual tuple, a size of the actual tuple, and a pointer to an address of the NH RemoteTuple.

Further, the fields 583 in free lists associated with Remote Tuples type 563 include information for creating the linked list. For example, for RT linked list 542: fields include a pointer to details of actual home of tuple and location of tuple record in home hash table structure including: address of the next RemoteTuple, an address of a previous RemoteTuple, an address of a HashElem parent, an actual home unit of tuple, and an address of LocalTuple at home.

Further, the fields 584 in free lists associated with Pending Records type 564 include information to recreate the original request into a work queue including: address of the next PendingReq, an address of previous PendingReq, an address of HashElem parent, etc. Additional information is provided including information needed to recreate the pending request for the tuple when the tuple is created including: a Requesting unit, a Requesting pid (process identifier) to facilitate memory address translations between effective address to real/physical addresses, a Requesting address, a Requesting size, a Requesting queue tag and a Request type (RD/IN).

Although not depicted, in a further embodiment, CNS controllers send commands between controllers when processing a tuple request.

For example Coordination Namespace APIs are provided with one coordination namespace access API is csOut( ) which is a command sent from a requesting unit to a NH or PH to take the tuple from requestor and store it, i.e., create it, in the CNS. A csIn( ) is a command sent from a requesting unit to a NH or PH to retrieve the tuple from CSN and store it in the requestor node (i.e., and remove the tuple from CNS).

For a tuple read, the coordination namespace API is structured as csRd(cs,tuplename,group,returntag) where "cs" is coordination namespace handle,"group" is the unit/node where the user suggests to look for the tuple first, and the "returntag" parameter enables identifying the request when a response is sent back by the CNS controller to the process.

In embodiments, when a requesting node 401 issues a software API "csOut( )" (hardware opcode=csout), the process at the node is requesting creation of a new tuple in the CNS, e.g., taking the tuple from request to store in CNS system 200 as described as follows:

The processing of the csOut( ) command message to create a tuple for storage at a node include steps of: receiving, at a node from a requesting node, a User Req csOut, and in response, checking at the workload scheduler whether the node is the preferred home for the tuple, e.g., check if node=preferred home. If the node receiving the csOut( ) command is not the preferred home, then the messaging unit sends the csOut( ) message to the preferred home for processing that tuple. If the node receiving the csOut( ) command is the preferred home, then the tuple engine at the node will check the hash of the tuple name and compute a hash entry address. Further the tuple engine at the receiving node issues a Read head pointer in the Hash table and searches or scans any associated hash element linked list structure for the corresponding entry in the DDR memory 500 to determine whether a tuple had been created for that tuple name.

The tuple engine will further check the response received from the DDR memory on board the unit 500, or alternatively, the system memory or any near memory which is faster/lower latency than the storage class memory, compute a next address of hash element and issue a Read hash element. Further, the tuple engine will check the DDR response, check the tuple name in hash element; and determine whether the tuple name matches the request. This process of computing next hash element address, reading the hash element and determining whether the tuple name has been created in a hash element is repeated continuously until reaching the end of the linked list structure.

That is, as long as the tuple name of hash element linked list structures does not match the request, then the tuple engine will obtain the head of local tuple list and issue a DDR read request for first local tuple. Then, the tuple engine gets the next pointer of retrieved tuple, and issues a DDR read request for next local tuple in list. The process of reading from the DDR is repeated until the last element of the linked list is read.

If, while traversing the linked list structure, it is determined that no tuple (hash element) has been created to match the tuple name requested, a new hash element is retrieved from the free pointer list and it is inserted into the list and a first record of the tuple name is created as a tuple hash element. The tuple engine will then obtain a free element for a local tuple record, update the local tuple head pointer with the newly obtained free element, and update the new tuple record with the location of data in the SCM. The tuple engine then completes processing, notifies the work scheduler/user of the completion and notifies the Natural Home of new record.

Upon scanning by the tuple engine, if a tuple hash element has already been created for the received tuple name in the linked list indicated in the csOut( ) request, then a new record is created in the associated linked list structure for that hash element.

In embodiments, the requesting node can issue a software API "csIn( )" (hardware opcode=csin) which is invoked to retrieve and remove a matching tuple from CNS. In CNS processing of the csIn( ) command at a node can include steps of: receiving, at a node, a User Req csIn, and in response, checking at the workload scheduler whether the node is the preferred home for the tuple, e.g., check if node=preferred home. If the node receiving the csIn( ) command is not the preferred home, then the messaging unit sends the message to the preferred home for processing thereat. If the node receiving the csIn( )command is the preferred home, then the tuple engine at the node will check the hash of the tuple and compute a hash entry address. Further the tuple engine at the receiving node issues a Read head pointer in the Hash table and search for the corresponding entry in DDR memory. In an embodiment, if the tuple record is not found in preferred home, then this request gets sent to the natural home where information on the tuple record will be found if the tuple exists. This might be in the form of a remote tuple record that informs where the actual home is for the tuple. If not found, it becomes a pending request record.

The tuple engine will further check the response received from a memory controller of the DDR memory, compute a next address of hash element and issue a Read hash element. Further, the tuple engine will check the DDR response, check the tuple name in hash element; and determine whether the tuple name matches the request.

If the tuple name does not match the request, then the tuple engine will continue to search the linked list for a matching tuple.

If the tuple name does match the request, then the tuple engine will obtain the head of local tuple list and issue a DDR read request for first local tuple. Then, the tuple engine performs removing the element from linked list, updating the hash element to point to next element in list, and delete the Hash element if it was last element.

The tuple engine then informs a local memory using a direct memory access (DMA) request, to transfer data from the SCM to the local memory. Then a command is issued to update the natural home in response to the removing the tuple. Then, the tuple engine completes processing and notifies work scheduler/user of the completion.

The extended memory architecture 10 of FIG. 1 provides a hardware accelerated mechanism to support federation service operations for multiple CNS namespace extended memory architectures.

Figure 6:
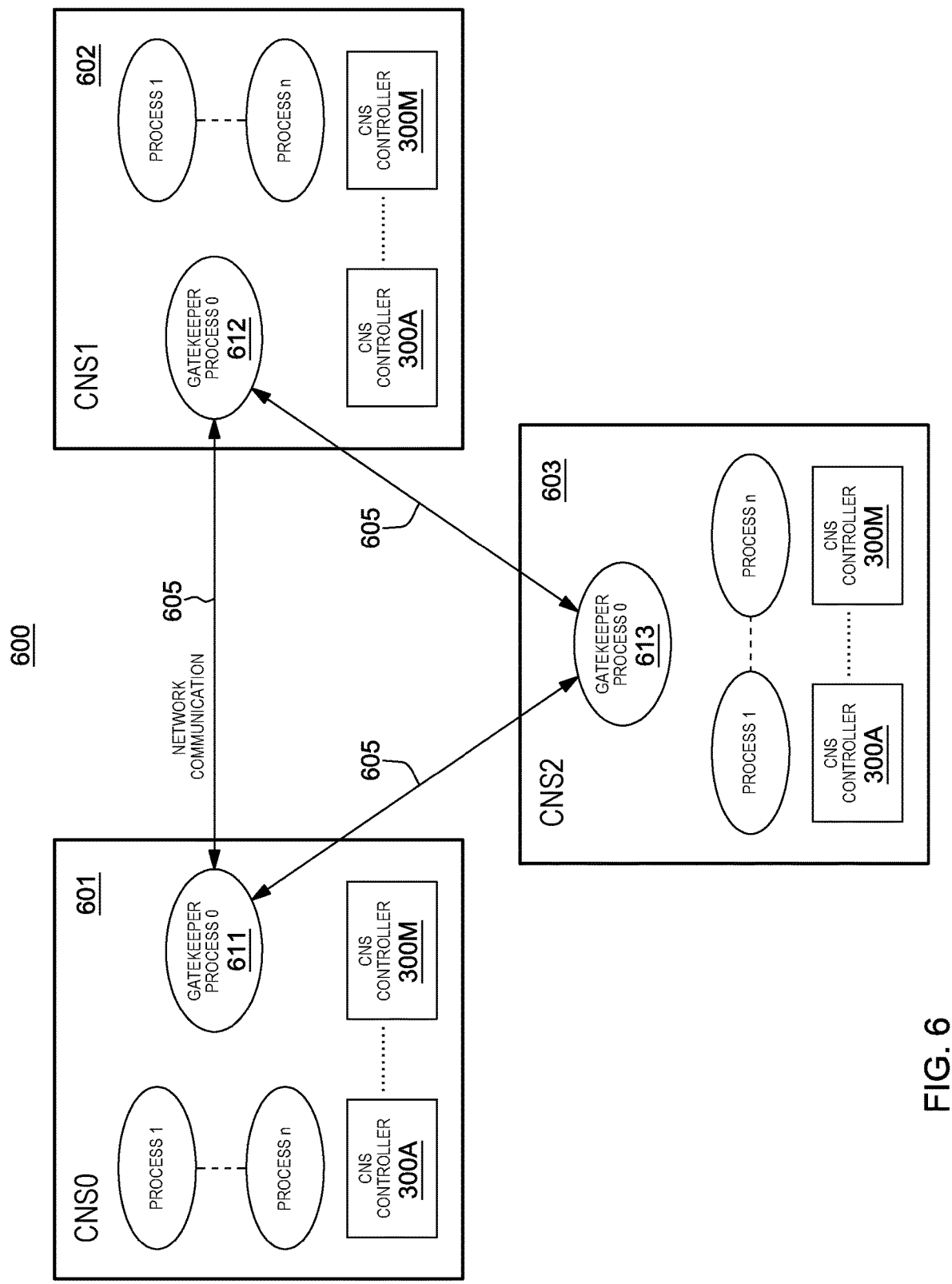
FIG. 6 depict conceptually multiple example distributed memory system implementing multiple CNS systems each running a gatekeeper process to provide a federated tuple database.

FIG. 6 shows an interconnection over a data and/or communications network of multiple CNS systems in which a federated distributed tuple storage database system 600 is implemented. In the example implementation shown in FIG. 6, three independent CNS systems CNS0 601, CNS1 602, CNS2 603 are shown communicating over a network. As an example, each CNS system may be geographically separated. Each CNS system 601, 602, 603 spans a plurality of compute nodes (not shown), such as nodes 12 in FIG. 1, that run one or more processes, e.g., Process 1, ..., Process n. Running in at least one or more nodes at each CNS 601, 602, 603 are respective one or more CNS controllers 300A, ..., 300M, in the embodiment of FIG. 3, configured to implement tuple storage system at nodes in that CNS. As shown, for networked communications amongst nodes at each CNS system 601, 602, 603 there are implemented bidirectional communication links 605, with communications over any network interface like ethernet or Infiniband® (Trademark of System I/O, Inc.) etc. In embodiments, each CNS system provides for a method of communication which involves participation of many nodes (all processes) in a communicator, without MPI (message passing interface standard) implementation.

As further shown in FIG. 6, one or more nodes in each CNS system 601, 602, 603 runs a respective gatekeeper process 611, 612, 613 that supports federation services for storing multiple named data element or tuple (key-value) storage across these CNS systems. A CNS controller, e.g., controller 300A, ..., 300M of a respective CNS system communicates with a respective gatekeeper process at that CNS system. Further, gatekeeper processes 611, 612, 613 communicate with each other over the network.

In the implementation of FIG. 6, processes belonging to a first CNS system e.g., CNS1, can checkout or access (read/modify/remove) its own stored tuples. However, processes at CNS1 can request access to tuples at a second CNS system e.g., CNS2, via a respective gatekeeper process. In this example, the gatekeeper process 612 of CNS1 communicates request messages with the gatekeeper process 613 of CNS2 over a network. In an embodiment, CNS2 gatekeeper process can limit access to the tuples in CNS1. For example, the gatekeeper may only allow copy or read. In an embodiment, the CNS2 gatekeeper can lock the tuple that it has given access to the requesting process in CNS1, e.g., reserve a connection to the tuple data should the requesting CNS gatekeeper select that remote gatekeeper process to provide the tuple data. At the end of the first process's use in the CNS1 system, the gatekeeper process at CNS1 returns the tuple item back to the CNS2. In an embodiment, while a tuple is "locked" for read for an external system, local processes on the node (CNS2) can continue to read the tuple. However, they will not be allowed to csIn( ) the tuple though as that would destroy the tuple. Local process in CNS2 should not be allowed to remove the tuple during the lock phase when CNS2 received request and confirmed tuple presence till the data is given out. Once the data has been given out, the local processes are enabled to read/remove the tuple.

In embodiments, use of a single gatekeeper process 611, 612 or 613 provides limited tuple access. In the absence of a gatekeeper tuples can be shared, e.g., by overlapping CNS1 and CNS2 and allow the tuples that need to be shared be linked in both as described in commonly-owned co-pending U.S. patent application Ser. No. 16/719,340 , or by adding the processes in CNS2 to CNS1 and vice versa. However, the gatekeeper ensures which external processes can have access to its tuples, e.g., it can reject requests that it does not authorize. In an application, two CNS can be employed for applications such that data from a CNS, e.g., CNS1, in a private system, can he hacked up or overflow to a public system (e.g., a hybrid cloud or hybrid reliable CNS) e.g., CNS2.

Figure 7:
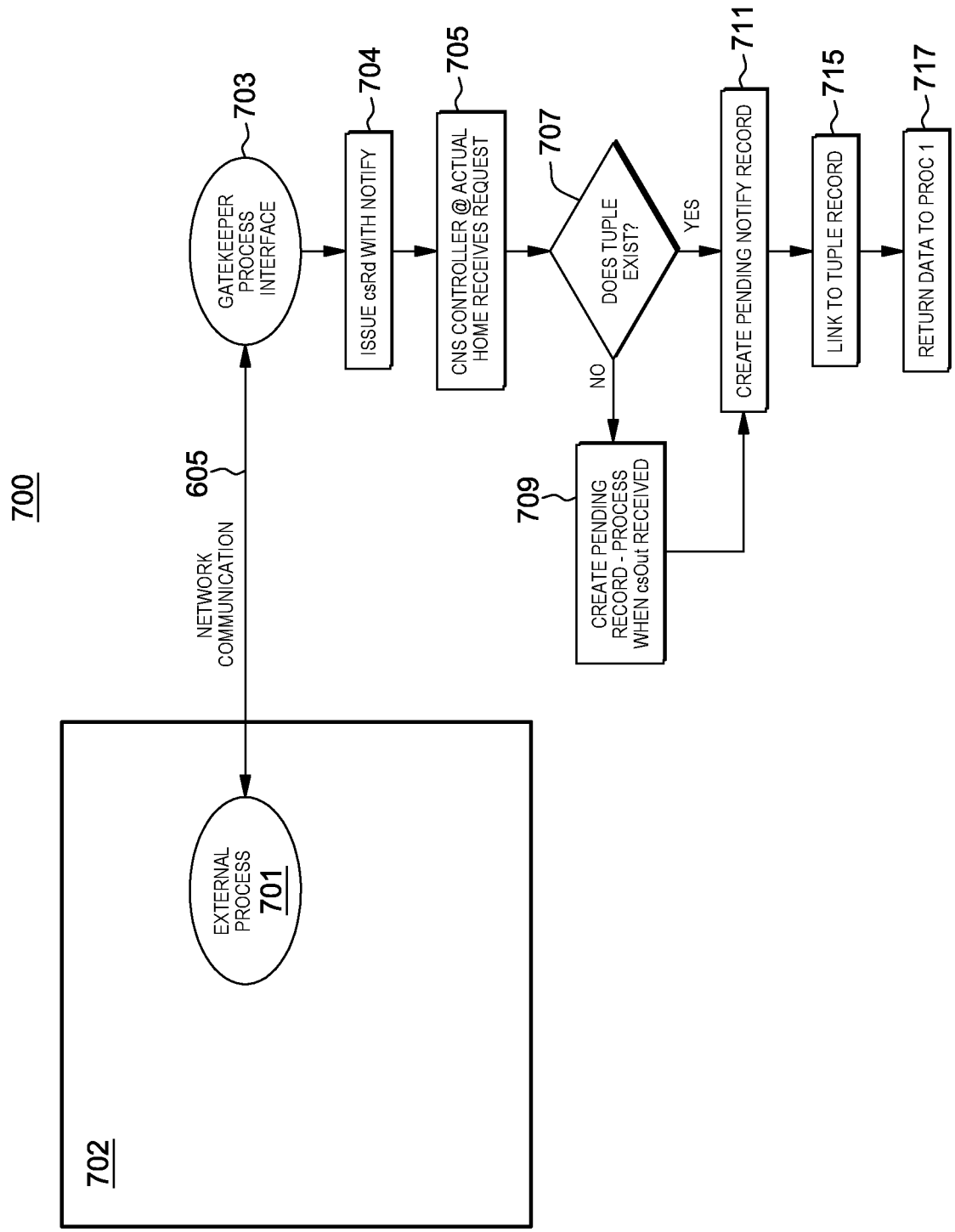
FIG. 7 depicts operations using a federation service gatekeeper process at a node(s) supporting the federation of stored tuples at a single CNS system in an embodiment.

FIG. 7 depicts operations 700 using a federation service gatekeeper process at a node(s) supporting the federation of stored tuples at a single CNS system. As shown in FIG. 7, a process, e.g., an external process 701 running at an external system, e.g., a process running at a computing node in a non-CNS system 702, needs to interact with CNS system that has the tuple, e.g., is part of a system that can store data in regular databases and is asking for data from a key value store provided by a CNS. Alternatively, external process 701 is a process running at a node of a first CNS system, e.g., CNS1 602, and communicates with a gatekeeper process interface of a gatekeeper process 703, e.g., running at another node at different or remote CNS, e.g., CNS2, using a network communication over communications link 605. The gatekeeper process at each CNS functions as both a tuple requester and a responder providing tuples for processes at other nodes of the other CNS.

In an embodiment, operations include the CNS system controller 300 at a CNS or non-CNS node associated with process 701 communicating a request to access and read a tuple data associated with a tuple created for a specified tuple name or key from a process at another CNS node over the link 605.

At 704, the gatekeeper process 621 at the receiving node associated with local CNS, receives the read request message from the external process and, responsively issues a csRd_withnotify( ) API command which is a tuple checkout with process notification command issued by a process for requesting a CNS controller to notify the process when a tuple having data it owns is modified or removed by another tuple process to provide the process with the option to continue to use the data or fetch new data. Alternatively, external process 701 can request data without requiring notification on tuple removal.

Commonly-owned, co-pending patent application No. 16/719,397 the whole content and disclosure of which is incorporated by reference as if fully set forth herein, describes operations for tuple checkout with process notification. In an embodiment, for tuple checkout with process notification, a coordination namespace API command is sent from a requesting unit to an AH that is structured according to:

csRd_withnotify(cs,tuplename,group,returntag,notifytype)

where "cs" is coordination namespace handle, "tuplename" is a tuple name (key or keyname),"group" is the unit/node where the user suggests to look for the tuple first, and the "returntag" parameter enables identifying the request when a response is sent back by the CNS controller to the process. The Notifytype=type "1" or type "2", where type 1 indicates a first type of notification indicating the CNS controller to embed a special pending notify pointer in the hash element for that tuplename for process notification, and type 2 indicating the CNS controller to create a pending record in the CNS with a pointer link to a pending notify record, created to inform the CNS controller of the process to be notified in the event of a tuple creation or deletion. The pending notification record indicates the identification and/or location of the process requesting notification. The CNS controller at the node accesses each pending notification record of a list of multiple linked pending notification records to provide notifications to each process waiting on the data.

Referring to FIG. 7, at 705, the CNS controller 300 at the actual home receives the csRd_withnotify( ) request. In response, at 707, the CNS controller determines whether a hash element exists corresponding to the tuplename or key specified in the csRd_withnotify( ) request.

If, at 707, the CNS controller determines that a hash element exists corresponding to the tuplename in the request, then at 711 the CNS controller invokes the CNS controller to create a pending notify record for that tuple name and the process proceeds to step 715.

If, at 707, the hash element does not exist, then responsive to the csRd_withnotify( ) request command, the process proceeds to 709 where the CNS controller 300 creates a pending record in the CNS system. That is, when another process issues a csOut for this tuple—the controller creates a tuple record at the preferred home and then notifies the NH on the creation of a tuple record. The controller at NH finds the pending record for this same tuple name and starts processing it as if it just received this request. So the csRd_withnotify starts being processed now at the NH—which forwards the request to the PH where the earlier csOut created the tuple record. Thus, continuing to 711, the CNS controller tuple engine the PH creates a pending notify record for that tuplename and then responds with the data. Then, the process continues to 715 when the CNS controller links the pending notification record to the created tuple record, and at 717, the CNS controller returns the data of the created tuple record to the requesting process 701.

Figure 8:
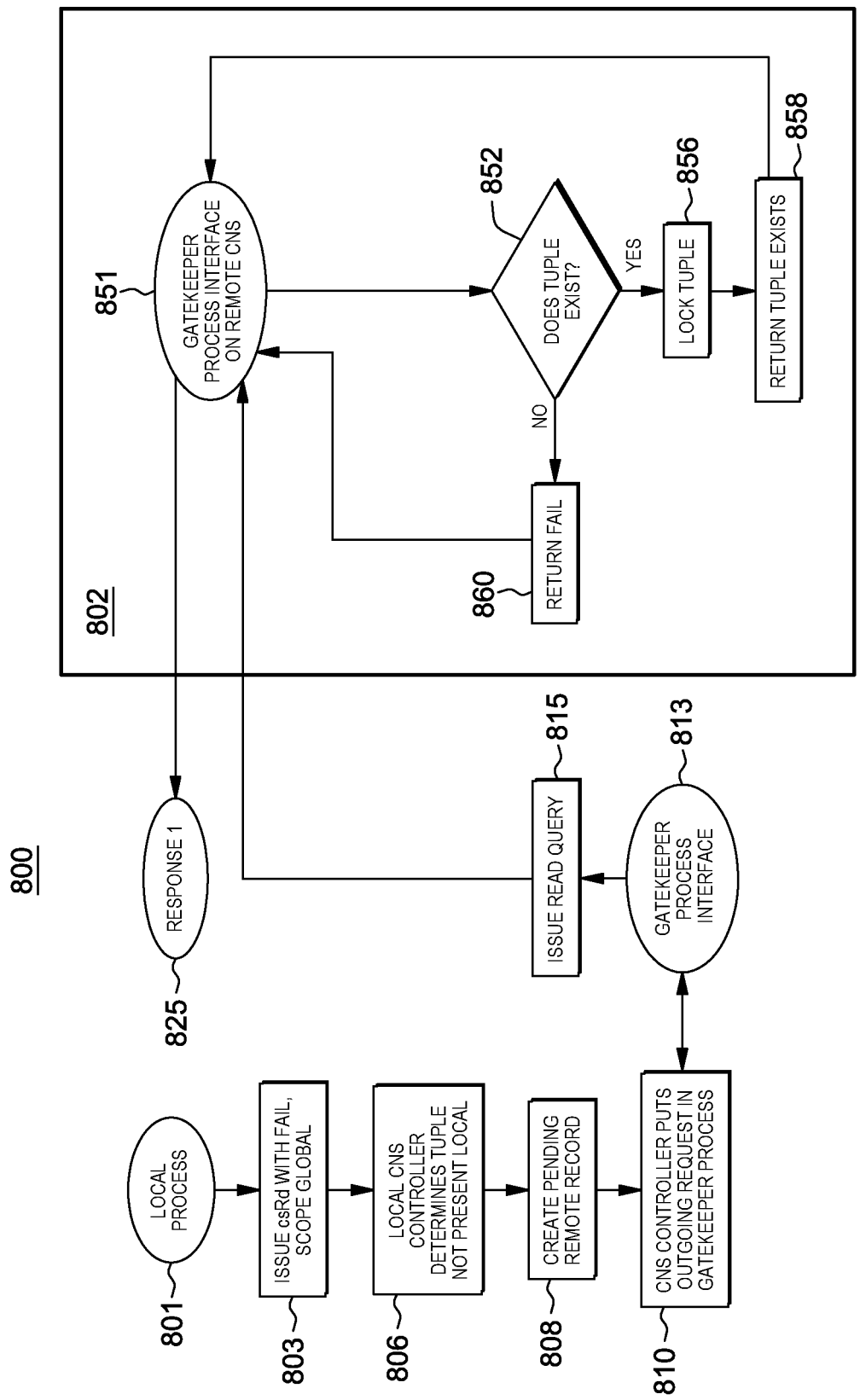
FIG. 8 depicts operations using a federation service gatekeeper process at a remote node(s) for providing a first type response when implementing the federation of stored tuples across multiple CNS systems in an embodiment.

FIG. 8 depicts operations 800 depicting an outgoing request from an external process, and operations 802 using a federation service gatekeeper process at a remote node(s) for handling incoming request from the external process. For example, the gatekeeper operations 802 support a federation service for accessing tuples stored in the remote CNS system including handling of a request from a requester (i.e., remote process whether at a CNS node or not) to provide a path for accessing a tuple and tuple data at the remote or "external" CNS. As shown in FIG. 8, a process, e.g., a local process 801 running at a requesting node of a first CNS system issues, at 803, a csRd_with_fail( ) API. This csRd_with_fail( ) API is of a global scope type. In an embodiment, for federating a tuple storage database implementing multiple CNS namespace systems, the csRd_with_fail( ) API command is a read tuple request sent by the CNS controller at the requesting node associated with the local process 801. Differing from the default action of a csRd( ) request, if the tuple is not found, at NH, the CNS controller at NH forwards the request to the node where the gatekeeper process is running within the same CNS. The CNS controller at the gatekeeper process node creates a pending remote record in its memory and issues a request to the gatekeeper process. The gatekeeper process stores this request in its outgoing queue. In an embodiment, the csRd_with_fail( ) is structured as:

csRd_with_fail(rqtag, tuplename, clientbufpointer, size, scope)

where "rqtag" is a tag that the client process which issued the request keeps to match with a response received from a remote gatekeeper process at a remote node when the request completes. In the case a pending remote record already exists, then a second pending remote record is created but a request is not sent to the gatekeeper and the response from the gatekeeper satisfies all pending remote requests. That is, when the local gatekeeper process issues a request to a remote system—it associates the request with a unique tag so that any response from a remote system includes this unique tag. This way the local gatekeeper process can associate the responses with a particular request it issued. The "clientbufpointer" is the place where the client finally wants the data to be written to. A memory space is allocated according to a "size" parameter which represents an amount of client buffer memory space for storing any data returned with the response. The "scope" parameter is initially local, but if the tuple is not found on the local CNS—it becomes global in scope indicating that it is now sent to the gatekeeper.

Thus, responsive to the local csRd_with_fail( ) command, at 806, the local CNS controller at the requesting node will determine whether a tuple for the specified tuplename exists locally. If, at 806, the Local CNS controller determines the tuple is not present locally (no NDE exists for that tuple name), the controller creates a pending remote record at 808 associated with the tuple name and proceeds to 810 where the controller sends a corresponding outgoing request to the local gatekeeper process outgoing queue at the same or different requesting node. The local process then waits for the data to be returned by the CNS controller. Otherwise, if a tuple for the specified tuple name exists locally, the CNS controller will access the tuple for that tuple name and provide the data back to the requesting local process 801.

In an embodiment, after creating a pending remote record in the requesting node, the process proceeds to 810 where the CNS Controller at the requesting node running the local process sends an outgoing request to the outgoing queue of the local gatekeeper process at the requesting node. The local gatekeeper process can be the gatekeeper process 611, 612, 613 of FIG. 6. At 813, FIG. 8 local gatekeeper process interface of the corresponding local gatekeeper process receives the outgoing request and at 815 issues a corresponding read query for communication over the network link for receipt at a gatekeeper interface associated with a receiving gatekeeper process 851 at a remote node associated with another CNS system.

In an embodiment, at 815, the gatekeeper broadcasts a read request query, e.g., a csRd_global( ) CNS system API of global scope to a plurality of remote gatekeeper processes to nodes for remote CNS systems to initiate, at those remote nodes, a tuple search to determine whether or not a tuple has been created and tuple data stored for the specified tuplename. An example broadcast query for retrieving a tuple is structured according to:

csRd_broadcast (gtkeepertag,gatekeeperid,tuplename)

where "gtkeepertag" is a pointer or outgoing queue entry number where the local gatekeeper stores the csRd( ) request it received from its local CNS controller, "gatekeeperid" is a tag specifying the remote node having the gatekeeper process at the remote system in addition to a gatekeeper "processid", and where "tuplename" is the key subject of the read request.

Multiple CNS systems can be connected to a given CNS as part of the federation and the gatekeeper of each of these CNSs have to be differentiated. In an embodiment, the CNS system id can be used to identify the gatekeeperid as well. This is also useful when multiple responses to a tuple request from different systems are received—the id helps identifying which gatekeeper process responded. In an embodiment, these could be part of the gtkeepertag—but separate requests would have to be sent to each of the different CNSs instead of a broadcast of same request.

At each respective remote system node receiving the broadcast query, the respective remote gatekeeper interface receives the broadcast query at 851 and at 852, each respective local CNS controller at the respective node will query in its local CNS for the tuple associated with the tuplename. If the tuple is not found by the CNS controller at the respective remote node, then at 860, a query fail message is generated and returned to the gatekeeper process 851 at that node. If, at 852, it is determined that the tuple exists at the target node, then at 856 the CNS controller locks the tuple, preventing any further local process from removing it (although allowing local processes to continue reading the tuple) and giving the requesting local process 801 access to that tuple data at that node. Then, at 858, the CNS controller will return to the gatekeeper process a message that the tuple exists. In an embodiment, if a local process at the remote node (not shown in FIG. 8) wants to remove a locked tuple, it creates a pending record for a csIn( ) from the local process on the locked tuple, and when the lock is removed the cns controller processes the csIn.

The gatekeeper process 851 will generate and via its interface communicate a query results response 825 (e.g., response 1) back to the requesting local process 801 when the cns controller returns either "fail" 860 or "tuple exists" 858 that includes the notification that the tuple either exists or does not exist at that targeted node.

In an embodiment, a CNS controller at the remote node associated with the receiving remote gatekeeper process responds to the received broadcast read request by issuing a first type response (Response1) 825 using an API structured according to:

csRemoteResponse(gtkeepertag,localtuplepointer,present)

where "gtkeepertag" is the identification of the location of the request that is broadcast in the outgoing queue; "localtuplepointer" or "ltp" is a parameter providing the address of the location of the tuple record associated with the existing tuple name and "present' is a parameter indicating whether the tuple and/or data is available or not. By providing the "ltp", the CNS controller on the remote node does not have to search for the tuple record again as it can access it directly.

Figure 10:
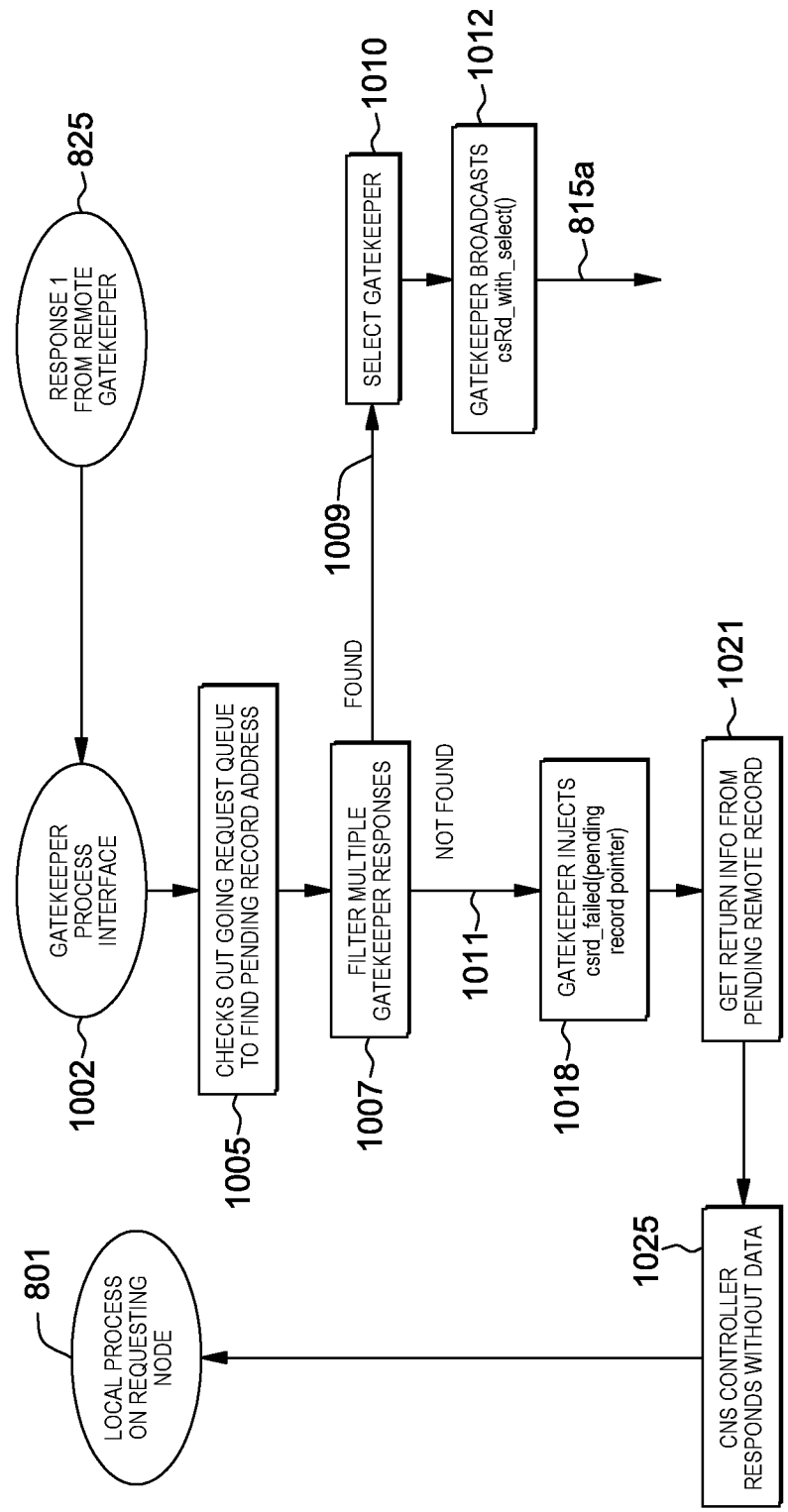
FIG. 10 depicts the operations supporting federation of stored tuples including the processing at a local gatekeeper process run by the CNS controller at the node issuing the broadcast read requests for a local process responsive to receiving the first type response.

FIG. 10 depicts the operations 1000 supporting federation of stored tuples including the processing at a gatekeeper process run by the CNS controller issuing the broadcast read requests for a local process, e.g., process 801, at the requesting node. Particularly, FIG. 10 depicts the requesting node gatekeeper operations 1000 in response to receiving the multiple responses 825 resulting from operations performed at the remote computing nodes of the multiple CNSs receiving the first broadcast csRd( ) request. In particular, each remote node gatekeeper process 802 depicted in FIG. 8 generates a response 825 indicating whether a tuple is present or not at the respective remote node as returned via each respective remote node. In an embodiment, operations of FIG. 10 are performed in response to the received csRemoteResponse(gtkeepertag,localtuplepointer,present) API.

Figure 9:
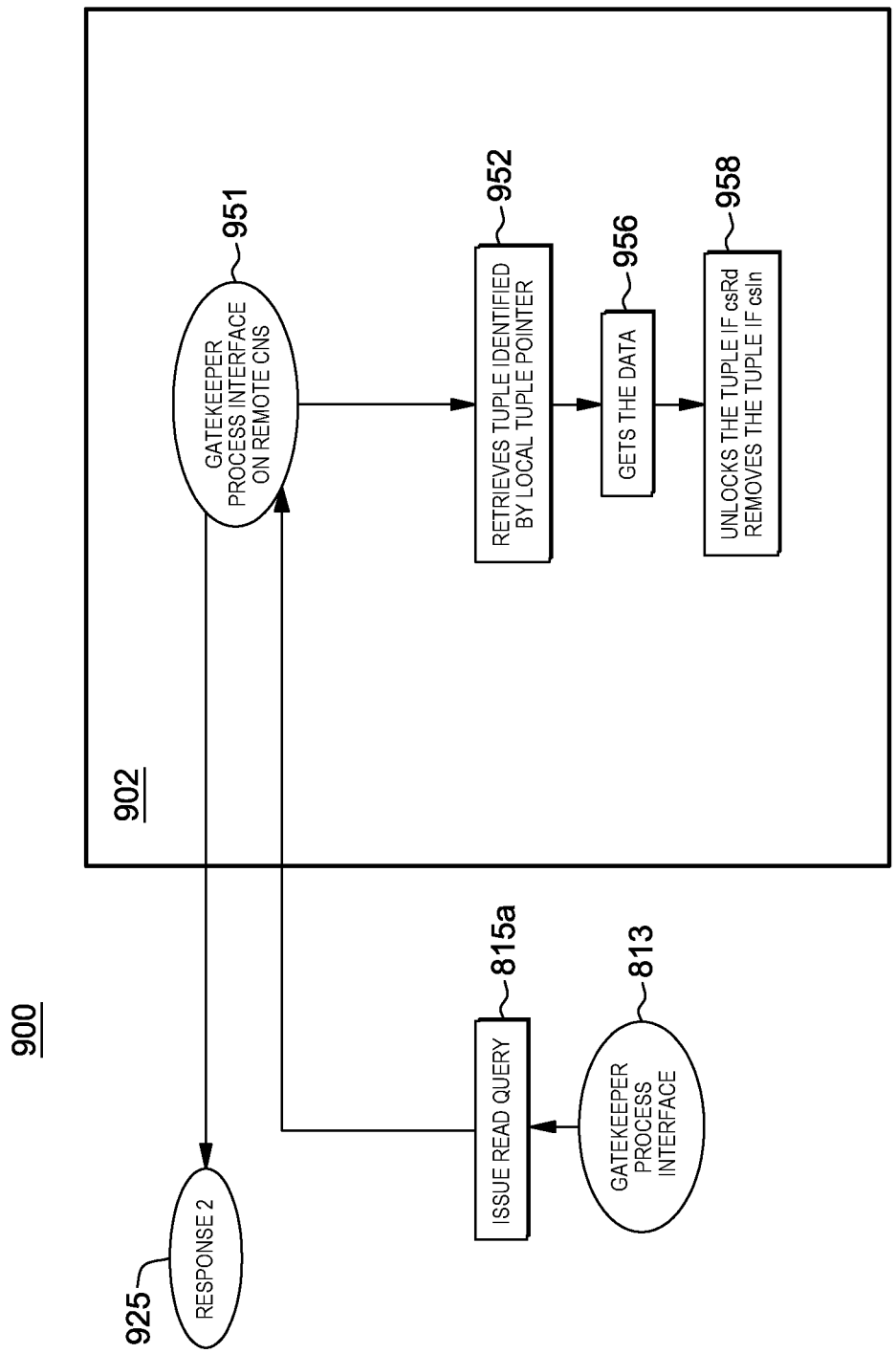
FIG. 9 depicts further operations supporting federation of stored tuples including the processing a read request for tuple data at a remote node of an "external" CNS in an embodiment and the providing a second type response including the requested tuple data.

As shown in the process of FIG. 10, the requesting node gatekeeper process issues a second broadcast following receipt of Response 1 825 from a respective gatekeeper process at the responding remote nodes. This second broadcast tells all remote gatekeepers that answered to the first csRd( ) broadcast with their tuple presence of the selected gatekeeper from which the requesting gatekeeper wants the tuple. The remote gatekeepers that were not selected will unlock their tuples while the selected gatekeeper will start processing as depicted in FIG. 9.

In FIG. 10, the gatekeeper process interface at 1002 at the requesting node receives a response 825 from a remote gatekeeper node that is of a first type indicating whether a tuple exists (or not) for that tuple name at the remote node. At 1005, gatekeeper process interface checks the identification of the remote gatekeeper process of each response received against entries in the outgoing request queue which is the queue maintained by the CNS controller at the requesting node on which the gatekeeper process is. This is used in identifying to which gtkeeper request the received response is for. Checking at the requesting node the outgoing queue at 1005 provides the mechanism for tracking responses received from the remote gatekeeper processes for the specific local request, e.g., by matching identification of the remote node or remote gatekeeper process indicated in the received response with an entry in the outgoing queue associated with a specific broadcast query for a local process. In traversing the queue, there is identified a pending remote request that matches the "gtkeepertag" to which the data from the remote tuple is to be received. That is, while Rqtag parameter identifies the original request in the local process request queue, when the request is being sent out, the "gtkeepertag" is sent as part of the read query and the tag corresponds to the entry in the outgoing queue of the gatekeeper process where the full request from the local process is stored and is awaiting a response from remote nodes.

Continuing to 1007, FIG. 10, for those received gatekeeper responses from remote nodes corresponding to an identified gtkeeper request (indicated in the outgoing queue maintained by the CNS controller for that remote query), the CNS controller at the requesting node filters out those remote gatekeeper responses for the corresponding broadcast request. For example, at 1009, the CNS controller at the requesting node filters out those received remote gatekeeper responses that have indicated the tuple data exist at that remote node. After filtering those remote gatekeeper responses found in the queue that have available the requested tuple, the process proceeds to 1010 where the CNS controller selects a remote gatekeeper process of the filtered gatekeeper processes who responded with a parameter indicating tuple/data availability for the received request. The CNS controller selects a remote gatekeeper process of the filtered gatekeeper processes having available tuple as requested according to a remote gatekeeper selection criteria. For example, proximity of a remote node or an age of the remote node can be used as selection criteria for selecting the remote gatekeeper.

Then, continuing at 1012, the CNS controller at the requesting node broadcasts a further message 815*a* (which is similar to the initial broadcast csRd( ) request 815) to all those filtered remote gatekeeper processes at the remote nodes with the gtkeepertag and the identification of the selected remote gatekeeper process associated with the remote node having the tuple data to be returned to the requesting process. This second broadcast message is a csRd_with_select( ) CNS system API according to:

csRd_with_select(gtkeepertag,gatekeeperid,selectedgatekeeper,localtuplepointer,tuplena me,localbufferaddr)

where "gtkeepertag" is the parameter specifying an identifier of the specific broadcast request (i.e., identification of the location of the broadcast csRd( ) read query (or alternatively csIn( )) request in the outgoing queue, "gatekeeperid" is a specified remote node at the remote CNS system plus a gatekeeper processid of a specific gatekeeper to receive a broadcast query from among multiple remote gatekeepers (the "gtkeepertag" parameter can include additional bits containing this information instead of the separate gatekeeperid), "selectedgatekeeper" is the parameter indicating the selected gatekeeper at the remote node selected to satisfy the tuple data request, "Localtuplepointer" is the parameter returned in the received Response1, "localbufferaddr " is where the requesting gatekeeper will store the data received from the remote gatekeeper and which is used by the DMA at the local node, and where tuplename is the key subject of the read request.

Otherwise, returning to 1007, FIG. 10, if the filtering determines at 1011 that no tuple data is available or a tuple does not exist at any of the remote nodes of another CNS, the gatekeeper process at the requesting node injects a csRd_failed(pending_record_pointer) message API at 1018, FIG. 10 for receipt by the CNS controller at the requesting node. Continuing to 1021, the CNS controller responsively gets return information from the pending remote record which, in the case no tuple was found in a remote CNS system, the CNS controller process at 1025 responds back to the local process 801 without the requested tuple data. That is, the local process at the requesting node is informed that no tuple record or data associated with the tuplename exists in any CNS system.

FIG. 9 depicts further operations 900 supporting federation of stored tuples including the processing of the broadcast csRd_with_select( ) API request 815*a* for the tuple data received at another or "external" CNS. Though described in connection with csRd( ) processing, FIGS. 8 and 9 can alternatively include the processing of a csIn( ) request to destructively read a tuple that can be issued by external process 801 running at a node of an external CNS. In particular, the process steps of FIG. 9 depict the issuance by the local gatekeeper process 813 at the requesting node of the second broadcast csRd_with_select(gtkeepertag,gatekeeperid,selectedgatekeeper,localtuplepointer,tuplename,local bufferaddr) CNS system API 815*a* for communication over network link for receipt at a gatekeeper interface associated with receiving gatekeeper processes at multiple nodes of the remote CNS systems. This second broadcast csRd_with_select( ) from the requesting node is responsive to receipt of the first response (response 1) received at the requesting node at 825, FIG. 8 from the remote nodes that inform the requesting gatekeeper of its tuple presence, and responsive to the operations 1000 performed by the gatekeeper process at the requesting node as depicted in FIG. 10. The "localbufferaddr" corresponds to a "localdatapointer" parameter indicating a memory location on the gatekeeper node's system memory, e.g., a temporary local buffer, where the data received with the response from a selected remote gatekeeper will be stored later.

In particular, the broadcast csRd_with_select( ) CNS system API is broadcast to all remote gatekeepers that answered to the first csRd( ) broadcast with their tuple presence and indicates the selected gatekeeper from which the requesting gatekeeper 813 wants the tuple. The remote gatekeepers that were not selected will unlock their tuples.

Otherwise, as shown in FIG. 9, the selected gatekeeper will start processing at 951 at the selected remote CNS 902. At each respective node, the remote gatekeeper process 951 receiving the broadcast csRD_with_select( ) query will process the request. Then at 952, local CNS controller retrieves the tuple identified by the local tuple pointer indicated by the hash element for that tuplename. Then, at 956, the CNS controller will retrieve the data pointed to by the pointer to the tuple data included in the retrieved tuple record if this remote node is selected by the gatekeeper process at the requesting node to provide the data back to the requesting local process. In an embodiment, the retrieved data is provided to the gatekeeper process 951 that will then send the data to the requesting gatekeeper that will then send the data to the requesting CNS controller that will then place the data in the requesting client's buffer. Then, at 958, the CNS controller will unlock the tuple if the received request was a csRd( ) or otherwise remove the tuple if the tuple request received was a csIn( ). That is, each of the other remaining non-selected remote gatekeeper processes at remote nodes receiving the get tuple data CNS system API will initiate a respective CNS controller for that remote node to unlock the tuple, thus making it available again for use by other processes.

In an alternative embodiment, the remote node providing the tuple data can option to leave the tuple locked while it has been loaned out and to unlock the tuple after it got read(csRd) or read with destructive(csIn) to a remote system. For example, this could be the case where the remote system intends to read and modify and doesn't want other processes to read it. Alternatively, in a less restrictive embodiment, the remote system still allow csRd by local processes and prevent destructive reads until the lock has been removed.

The gatekeeper process 951 then generates and via its interface communicates a remote data movement response message 925 (Response2) that includes the tuple data back to the requesting gatekeeper process 813 for eventual receipt by local process 801.

In an embodiment, a CNS controller at the remote node associated with the receiving remote gatekeeper process responds to the received broadcast read request by issuing a response 925 according to an API structured as:

csData(gtkeepertag, data)

CNS system API where the "gtkeepertag" is the identification of the local gatekeeper process of the requesting node to receive the tuple data (the unique tag that was issued by the gatekeeper for association with the response) and "data" is the requested tuple data from the selected remote node.

Only the gatekeeper process identified by the "gtkeeperid" that is associated with the remote node selected to provide the tuple data will respond with the requested tuple data by issuing the csData(gtkeepertag, data) API where "gtkeepertag" is the identification of the local gatekeeper process of the requesting node to receive the data and "data" is the data associated with the requested tuple returned from the remote gatekeeper process at the remote node.

Figure 11:
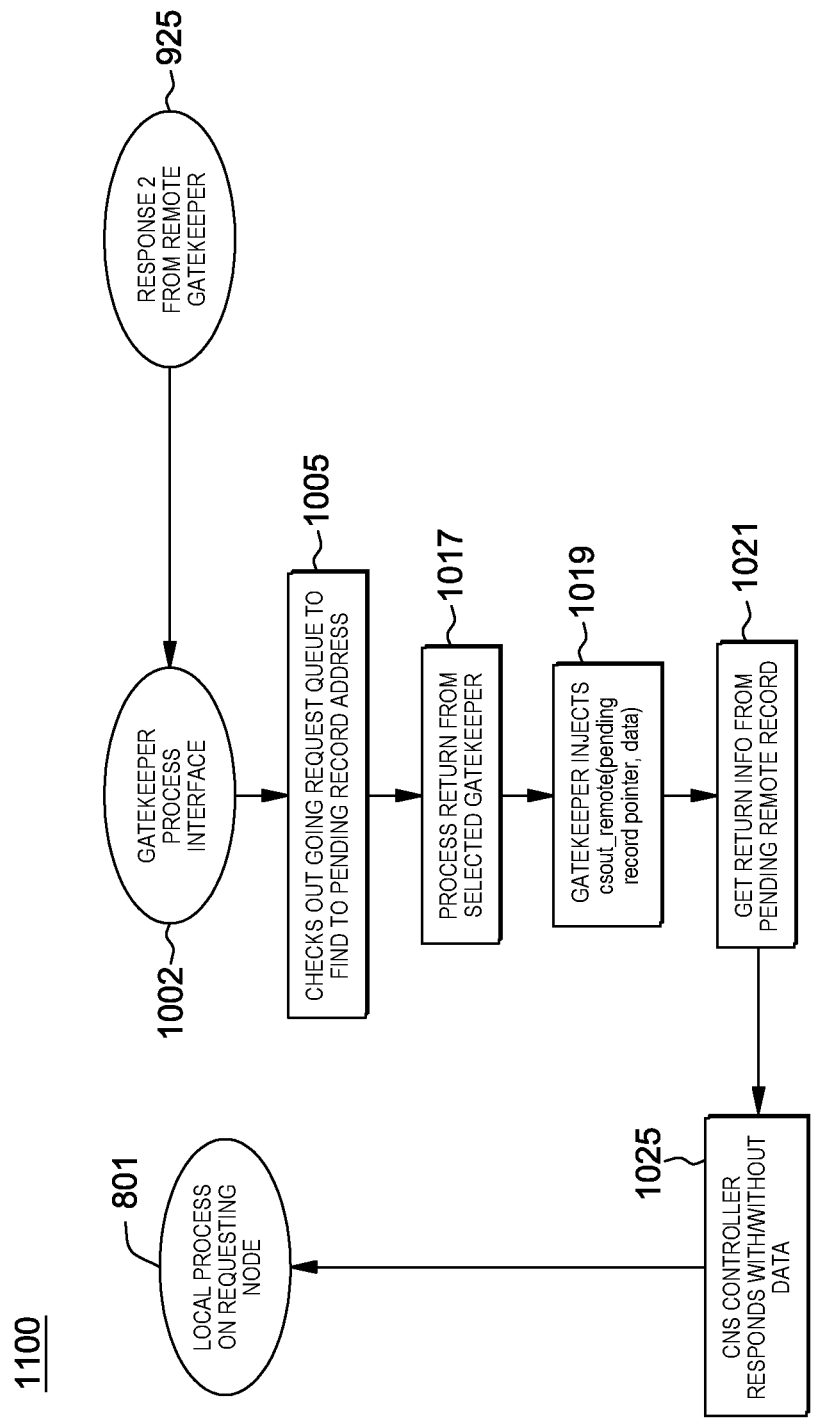
FIG. 11 depicts the operations supporting federation of stored tuples including the processing at a local gatekeeper process run by the CNS controller at the node issuing the broadcast read request for a local process responsive to receiving the second type response.

FIG. 11 depicts the operations 1100 supporting federation of stored tuples including the processing at a gatekeeper process run by the CNS controller at the requesting node issuing the broadcast read requests for a local process, e.g., process 801, at the requesting node. Particularly, FIG. 11 depicts the requesting node gatekeeper operations 1100 in response to receiving the response 925 including the tuple data obtained from operations performed by the selected remote gatekeeper process at the selected remote computing node of another CNS system responsive to receiving the broadcast csRd_with_select( ) API.

In FIG. 11, the local gatekeeper process interface at 1002 receives the response 925 of the second type providing the tuple data returned from the selected gatekeeper process at the selected remote node. At 1005, FIG. 11, the local gatekeeper process interface checks the identification of the remote gatekeeper tag of the response received against entries in the outgoing request queue maintained by the CNS controller for use in identifying to which gtkeeper request the received response is for. That is, when the local gatekeeper process at the requesting node receives the data and associated "rqtag", it uses the rqtag to identify the full request, stores the data to a temporary local buffer, and notifies the local CNS controller at the requesting node by issuing a csPending_response( ) API. In response, the local CNS controller will lookup the pending remote record and move the requested tuple data from this buffer to the appropriate client/local process memory space address indicated by the "clientbufpointer" that was provided as part of the initial request. In the case a pending remote record already exists, then a second pending remote record is created but a request is not sent to the gate keeper and the response from the gate keeper satisfies all pending remote requests.

Continuing, as shown in FIG. 11, at 1017, the gatekeeper process at the requesting node waits on receiving the tupledata returned from the selected remote node of the remote CNS system. Once response 2 925 is returned with data, the tupledata is stored at a "localdatapointer" corresponding to the "localbufferaddr" which is the temporary local buffer the pointer to which was sent out in csRd_with_select( ) and the process proceeds to 1019 where the gatekeeper process inserts csOut_remote(pending_record_pointer, data address of localbuffer, sizeof data) and continuing to 1021, then the CNS controller responsively gets return information from the pending remote record and moves the data to the client buffer associated with the local process on the node that originated the request. The address of the client buffer is stored in the pending notify record. Then, the CNS controller process at 1025 will respond back to the local process 801 with the requested tuple data.

Thus in embodiments there is provided a method for retrieving tuple from connected independent CNS systems wherein the Local CNS Controller sends the read request to the local gatekeeper to retrieve a first tuple and creates a local pending remote record. The Local gatekeeper sends a broadcast query to a plurality of remote gatekeepers for the first tuple and Remote gatekeepers query in its local CNS for first tuple and lock for first tuple if it exists and sends back query results. The Local gatekeeper receives results from a plurality of remote gatekeepers for the first tuple. If at least one remote gatekeeper responds that tuple exists-local gatekeeper selects one remote gatekeeper and broadcasts a read for tuple data with selected gatekeeper. Non selected gatekeepers unlocks tuple record if it exists. Selected remote gatekeeper returns tuple data. Local gatekeeper processes returned tuple data and notifies local process that requested it based on the pending remote record. If all remote gatekeepers responds that tuple did not exist—local process is notified of the fail.

Advantageously, the systems and method providing a federation service for tuple storage in multiple CNS system is a solution for load balancing of tuples across separate CNS systems, providing increased reliability between storage levels, and enabling database migration from one keyvalue store to another.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Having thus described our invention, what we claim as new, and desire to secure by Letters Patent is:

1. A method for federating tuple data for multiple connected independent coordination namespace systems (CNS) extended memory systems, each independent CNS system including multiple coordination namespaces, the method comprising:
    receiving, using a processor at a local coordination namespace (CNS) extended memory system, a request for a tuple data from a local process running at a requesting computing node implementing said local CNS system;

determining, using the processor, whether a tuple comprising requested tuple data exists for the requesting local process at the local coordination namespace (CNS) extended memory system;
responsive to determining a requested tuple data for the local process does not exist in said local coordination namespace (CNS) system, placing, using the processor, said request for a tuple data in a local gatekeeper process running at a node associated with the local CNS extended memory system, and broadcasting, using the local gatekeeper process, a first read request over a network to one or more remote gatekeeper processes, a remote gatekeeper process running at a respective remote node associated with a respective different remote CNS system, each different remote CNS storge system being independent from said local CNS extended memory system, said broadcast read request indicating a request for the tuple data in each of the different remote CNS systems;
receiving, at the local gatekeeper process, from one or more of said remote gatekeeper processes running at the respective remote nodes of the respective different remote CNS systems, a response indicating whether the tuple data exists at the respective remote CNS system; and
responsive to receiving, at the local gatekeeper process, respective indications that the requested tuple data exists at the respective different remote CNS systems, selecting a particular remote gatekeeper at a remote node of a respective different remote CNS system to provide the local process with the requested tuple data; and
communicating, using the local gatekeeper process, a request for the data to the selected remote gatekeeper process; and
receiving, at the local gatekeeper process, from the selected remote gatekeeper process running at the remote node of the different remote CNS system, the requested tuple data for use by the requesting local process.

2. The method of claim 1, wherein said communicating a request for the data to the selected remote gatekeeper process comprises:
broadcasting, using the local gatekeeper process, a second read request over the network to the one or more remote gatekeeper processes running at respective one or more remote nodes associated with respective one or more different remote CNS systems, said second read request broadcast indicating an identification of said remote gatekeeper process selected to provide said tuple data.

3. The method of claim 2, wherein, in response to receiving, at the plurality of remote gatekeeper processes running at remote nodes associated with respective remote CNS systems, said broadcast second read request, a remote gatekeeper process at a receiving remote note of a respective remote CNS tuple system performs:
determining whether that remote gatekeeper process has been selected based on said identification of said selected remote gatekeeper process; and if not selected, unlocking the tuple to permit access of said tuple record data by other local processes at the remote node or other nodes of the multiple CNS systems.

4. The method of claim 1, wherein responsive to receipt of said first read request broadcast over a network, a remote gatekeeper process at a receiving remote note of a respective remote CNS tuple system performs:

querying, using a local processor, its respective remote CNS system for said tuple data; and
upon determining said tuple data exists at said remote CNS system, locking said tuple to prevent removal of the corresponding tuple; and
sending back the query result indicating existence of said tuple data at the remote CNS system.

5. The method of claim 1, further comprising:
creating, using the processor, a pending pointer record responsive to determining the requested tuple data for the local process does not exist in said local coordination namespace (CNS) system, said pending pointer record having a pointer pointing to an address location for storing a requested tuple data; and
placing, using the processor, said requested tuple data pointer returned from a remote CNS system at the address location to a pointer of said pending pointer record.

6. The method of claim 1, further comprising:
tracking, using the processor, received responses from one or more of said plurality of remote gatekeeper processes with a particular tuple data request from the requesting local process, wherein said gatekeeper process associates the responses with a particular issued tuple data request it broadcast.

7. The method of claim 6, wherein said tracking comprises:
generating, using the processor, at the requesting node, an outgoing request queue indicating identification of each remote gatekeeper process node receiving the broadcast request;
matching, using the processor, each received response from said plurality of remote gatekeeper processes against identification entries of said remote gatekeeper process nodes in said outgoing request queue associated with the particular tuple data request.

8. A federation system for tuple data storage at nodes implementing multiple independent coordination namespace systems (CNS) extended memory systems, each independent CNS system including multiple coordination namespaces, said system comprising:
one or more data generated by local processes running at distributed compute nodes across said multiple independent CNS extended memory systems, said data stored as tuple data associated with a tuple name; and
a controller circuit associated with a requesting node associated with a local CNS system of said multiple independent CNS extended memory systems, said controller circuit having a hardware processor configured to perform a method to:
receive a request for a tuple data from a local process running at the requesting computing node implementing said local CNS system;
determine whether a tuple comprising requested tuple data exists for the requesting local process at the local CNS extended memory system;
in response to determining a requested tuple data for the local process does not exist in said local CNS system, place said tuple data request in a local gatekeeper process running at a node associated with the local CNS system, and broadcast, using the local gatekeeper process, a first read request over a network to one or more remote gatekeeper processes, a remote gatekeeper process running at a respective remote node associated with a respective different remote CNS system, each different remote CNS storge system being independent from said local CNS extended memory system, said broadcast read request indicating a request for the tuple data in each of the different remote CNS systems;

receive at the local gatekeeper process from one or more of said remote gatekeeper processes running at the respective remote nodes of the respective different remote CNS systems, a response indicating whether the tuple data exists at the respective remote CNS system; and in response to said receiving at the local gatekeeper process respective indications that the requested tuple data exists at the respective different remote CNS systems, selecting a particular remote gatekeeper at a remote node of a respective different remote CNS system to provide the local process with the requested tuple data;

communicate using the local gatekeeper process a request for the data to the selected remote gatekeeper process; and receive at the local gatekeeper process from the selected remote gatekeeper process running at the remote node of the different remote CNS system, the requested tuple data for use by the requesting local process.

9. The federation system of claim 8, wherein to communicate a request for the data to the selected remote gatekeeper process, said hardware processor of said controller circuit associated with a requesting node is further configured to:

broadcast using the local gatekeeper process a second read request over the network to the one or more remote gatekeeper processes running at respective one or more remote nodes associated with respective one or more different remote CNS systems, said second read broadcast request indicating an identification of said remote gatekeeper process selected to provide said tuple data.

10. The federation system of claim 9, wherein, in response to receiving, at the plurality of remote gatekeeper processes running at remote nodes associated with respective remote CNS systems, said broadcast second read request, a remote gatekeeper process at a receiving remote note of a respective remote CNS tuple system being further configured to:

determine whether that remote gatekeeper process has been selected based on said identification of said selected remote gatekeeper process; and if not selected, unlock the tuple to permit access of said tuple record data by other local processes at the remote node or other nodes of the multiple CNS systems.

11. The federation system of claim 8, wherein responsive to receipt of said first read request broadcast over a network, a hardware processor of a controller circuit associated with a remote gatekeeper process running at a remote node receiving the read request is configured to:

query its respective remote CNS system for said tuple data; and upon determining said tuple data exists at said remote CNS system, lock said tuple to prevent removal of the corresponding tuple; and send back the query results indicating existence of said tuple data at the remote CNS system.

12. The federation system of claim 8, wherein said hardware processor of said controller circuit associated with a requesting node is further configured to:

create a pending pointer record responsive to determining the requested tuple data for the local process does not exist in said local coordination namespace (CNS) system, said pending pointer record having a pointer pointing to an address location for storing a requested tuple data; and place said requested tuple data pointer returned from a remote CNS system at the address location to a pointer of said pending pointer record.

13. The federation system of claim 8, wherein said hardware processor of said controller circuit associated with a requesting node is further configured to:

track received responses from one or more of said plurality of remote gatekeeper processes with a particular tuple data request from the requesting local process, wherein said gatekeeper process associates the responses with a particular issued tuple data request it broadcast.

14. The federation system of claim 13, wherein to track received responses, said hardware processor of said controller circuit associated with a requesting node is further configured to:

generate, at the requesting node, an outgoing request queue indicating identification of each remote gatekeeper process node receiving the broadcast request; and match each received response from said plurality of remote gatekeeper processes against identification entries of said remote gatekeeper process nodes in said outgoing request queue associated with the particular tuple data request.

15. A non-transitory computer readable medium comprising instructions that when executed by at least one hardware processor, cause the at least one hardware processor to perform a method for federating tuple data for multiple connected independent coordination namespace systems (CNS) extended memory systems, each independent CNS system including multiple coordination namespaces, said method comprising:

receiving at a local coordination namespace (CNS) extended memory system, a request for a tuple data from a local process running at a requesting computing node implementing said local CNS system;

determining whether a tuple comprising requested tuple data exists for the requesting local process at the local coordination namespace (CNS) extended memory system;

responsive to determining a requested tuple data for the local process does not exist in said local coordination namespace (CNS) system, placing, using the processor, said tuple data request in a local gatekeeper process running at a node associated with the local CNS extended memory system, and broadcasting, using the local gatekeeper process, a first read request over a network to one or more remote gatekeeper processes, a remote gatekeeper process running at a respective remote node associated with a respective different remote CNS system, each different remote CNS storge system being independent from said local CNS extended memory system, said broadcast read request indicating a request for the tuple data in each of the different remote CNS systems;

receiving at the local gatekeeper process from one or more of said remote gatekeeper processes running at the respective remote nodes of the respective different remote CNS systems, a response indicating whether the tuple data exists at the respective remote CNS system; and responsive to receiving at the local gatekeeper process respective indications that the requested tuple data exists at the respective different remote CNS systems, selecting a particular remote gatekeeper at a remote node of a respective different remote CNS system to provide the local process with the requested tuple data; and communicating using the local gatekeeper process a request for the data to the selected remote gatekeeper process; and receiving at the local gatekeeper process from the selected remote gatekeeper process running at the remote node of the different remote CNS system, the requested tuple data for use by the requesting local process.

16. The non-transitory computer readable medium of claim 15, wherein said communicating a request for the data to the selected remote gatekeeper process comprises:

broadcasting using the local gatekeeper process a second read request over the network to the one or more remote gatekeeper processes running at respective one or more remote nodes associated with respective one or more different remote CNS systems, said second read request broadcast indicating an identification of said remote gatekeeper process selected to provide said tuple data.

17. The non-transitory computer readable medium of claim 15, wherein responsive to receipt of said first read request broadcast over a network, a remote gatekeeper process at a receiving remote note of a respective remote CNS tuple system performs a method comprising:

querying its respective remote CNS system for said tuple data; and upon determining said tuple data exists at said remote CNS system, locking said tuple to prevent removal of the corresponding tuple; and sending back the query results indicating existence of said tuple data at the remote CNS system.

18. The non-transitory computer readable medium of claim 17, wherein, in response to receiving, at the plurality of remote gatekeeper processes running at remote nodes associated with respective remote CNS systems, said broadcast second read request, a remote gatekeeper process at a receiving remote note of a respective remote CNS tuple system performs a method comprising:

determining whether that remote gatekeeper process has been selected based on said identification of said selected remote gatekeeper process; and if not selected, unlocking the tuple to permit access of said tuple record data by other local processes at the remote node or other nodes of the multiple CNS systems.

19. The non-transitory computer readable medium of claim 15, wherein the method further comprises:

creating a pending pointer record responsive to determining the requested tuple data for the local process does not exist in said local coordination namespace (CNS) system, said pending pointer record having a pointer pointing to an address location for storing a requested tuple data; and placing said requested tuple data pointer returned from a remote CNS system at the address location to a pointer of said pending pointer record.

20. The non-transitory computer readable medium of claim 15, wherein the method further comprises:

tracking received responses from one or more of said plurality of remote gatekeeper processes with a particular tuple data request from the requesting local process, wherein said gatekeeper process associates the responses with a particular issued tuple data request it broadcast.

\* \* \* \* \*